United States Patent
Haim et al.

(10) Patent No.: US 9,392,553 B2
(45) Date of Patent: Jul. 12, 2016

(54) DETERMINING POWER HEADROOM IN A WIRELESS NETWORK

(75) Inventors: John W. Haim, Baldwin, NY (US); Sung-Hyuk Shin, Northvale, NJ (US); Janet A. Stern-Berkowitz, Little Neck, NY (US); Pascal M. Adjakple, Great Neck, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 580 days.

(21) Appl. No.: 12/896,177

(22) Filed: Oct. 1, 2010

(65) Prior Publication Data

US 2011/0105173 A1 May 5, 2011

Related U.S. Application Data

(60) Provisional application No. 61/247,676, filed on Oct. 1, 2009, provisional application No. 61/248,373, filed on Oct. 2, 2009, provisional application No. 61/285,343, filed on Dec. 10, 2009, provisional application No. 61/329,194, filed on Apr. 29, 2010, provisional application No. 61/356,472, filed on Jun. 18, 2010.

(51) Int. Cl.
*H04W 52/04* (2009.01)
*H04W 52/36* (2009.01)
(Continued)

(52) U.S. Cl.
CPC .......... *H04W 52/365* (2013.01); *H04W 52/244* (2013.01); *H04W 52/325* (2013.01); *H04W 52/34* (2013.01)

(58) Field of Classification Search
CPC .... G08C 17/00; H04W 72/04; H04W 52/325; H04W 52/146; H04W 52/365
See application file for complete search history.

(56) References Cited

U.S. PATENT DOCUMENTS 5,491,837 A 2/1996 Haartsen
5,687,171 A 11/1997 Shin et al.
(Continued)

FOREIGN PATENT DOCUMENTS

CN 101030795 A 9/2007
CN 101404527 A 4/2009
(Continued)

OTHER PUBLICATIONS

Ericsson, "[70#15] LTE CA: PHR Handling," 3GPP TSG-RAN WG2 #70bis, Stockholm, Sweden, Jun. 28-Jul. 2, 2010.
(Continued)

*Primary Examiner* — Bobbak Safaipour
(74) *Attorney, Agent, or Firm* — Condo Roccia Koptiw LLP

(57) ABSTRACT

Methods and apparatus for power control are described. Methods are included for calculating and signaling power control related data to support multiple component carriers (CCs) for which transmission may be accomplished with one or more WTRU power amplifiers (PAs). Methods are included for calculating and signaling one or more of CC-specific power control related data and PA-specific power control related data. The power control related data may include one or more of maximum power, power headroom, and transmit power. Methods for selecting which power control related data to exchange are included. Methods are included for calculating and signaling power control related data for physical UL shared channel (PUSCH), physical UL control channel (PUCCH), and simultaneous PUSCH and PUCCH transmission.

22 Claims, 7 Drawing Sheets

(51) Int. Cl.
*H04W 52/24* (2009.01)
*H04W 52/32* (2009.01)
*H04W 52/34* (2009.01)

(56) References Cited

U.S. PATENT DOCUMENTS

| | | | |
|---|---|---|---|
| 5,845,212 A | 12/1998 | Tanaka | |
| 5,991,618 A | 11/1999 | Hall | |
| 7,054,633 B2 | 5/2006 | Seo et al. | |
| 7,403,791 B2 | 7/2008 | Oki et al. | |
| 7,590,095 B2 | 9/2009 | Chen et al. | |
| 8,228,855 B2 | 7/2012 | Sambhwani et al. | |
| 8,315,320 B2 | 11/2012 | Zhang et al. | |
| 8,335,466 B2* | 12/2012 | Cai | H04W 72/042 455/434 |
| 8,355,388 B2* | 1/2013 | Womack | H04W 74/0866 370/338 |
| 8,402,334 B2* | 3/2013 | Yu | H04L 1/1812 714/749 |
| 8,446,856 B2* | 5/2013 | Womack | H04B 7/2606 370/278 |
| 8,699,391 B2* | 4/2014 | Yeon | H04W 72/0413 370/311 |
| 8,711,722 B2* | 4/2014 | Zhu | H04W 52/146 370/252 |
| 2003/0232622 A1 | 12/2003 | Seo et al. | |
| 2005/0085191 A1 | 4/2005 | Iacono et al. | |
| 2005/0111391 A1 | 5/2005 | Oki et al. | |
| 2005/0169293 A1 | 8/2005 | Zhang et al. | |
| 2006/0003787 A1 | 1/2006 | Heo et al. | |
| 2006/0270431 A1 | 11/2006 | Yoshi | |
| 2007/0010269 A1 | 1/2007 | Azuma | |
| 2008/0039057 A1 | 2/2008 | Worrall et al. | |
| 2008/0220806 A1 | 9/2008 | Shin et al. | |
| 2009/0175187 A1 | 7/2009 | Jersenius et al. | |
| 2009/0191910 A1 | 7/2009 | Athalye et al. | |
| 2009/0213805 A1 | 8/2009 | Zhang et al. | |
| 2009/0239590 A1* | 9/2009 | Parkvall | H04W 52/58 455/572 |
| 2009/0290538 A1* | 11/2009 | Kim | H04J 13/0074 370/328 |
| 2010/0041428 A1 | 2/2010 | Chen et al. | |
| 2010/0098012 A1* | 4/2010 | Bala | H04L 5/001 370/329 |
| 2010/0113004 A1 | 5/2010 | Cave et al. | |
| 2010/0113057 A1 | 5/2010 | Englund et al. | |
| 2010/0120446 A1 | 5/2010 | Gaal | |
| 2010/0158147 A1 | 6/2010 | Zhang et al. | |
| 2010/0238892 A1 | 9/2010 | Dahlman et al. | |
| 2010/0246561 A1* | 9/2010 | Shin | H04W 52/32 370/345 |
| 2010/0296470 A1* | 11/2010 | Heo | H04W 52/365 370/329 |
| 2010/0297993 A1* | 11/2010 | Heo | H04W 52/365 455/423 |
| 2011/0038271 A1* | 2/2011 | Shin | H04W 52/146 370/252 |
| 2011/0039568 A1* | 2/2011 | Zhang | H04W 74/002 455/452.1 |
| 2011/0064159 A1 | 3/2011 | Ko et al. | |
| 2011/0105173 A1 | 5/2011 | Haim et al. | |
| 2011/0134968 A1* | 6/2011 | Han | H04L 27/2627 375/146 |
| 2011/0141928 A1* | 6/2011 | Shin | H04L 1/0028 370/252 |
| 2011/0207415 A1* | 8/2011 | Luo | H04B 7/0413 455/68 |
| 2011/0280169 A1 | 11/2011 | Seo et al. | |
| 2012/0034927 A1* | 2/2012 | Papasakellariou | H04L 1/1861 455/450 |
| 2012/0093020 A1 | 4/2012 | Iwai et al. | |
| 2012/0113831 A1* | 5/2012 | Pelletier | H04L 5/0058 370/252 |
| 2012/0115520 A1* | 5/2012 | Rossel | H04L 1/20 455/501 |
| 2013/0010706 A1* | 1/2013 | Kela | H04W 52/146 370/329 |
| 2013/0028231 A1 | 1/2013 | Zhang et al. | |
| 2013/0308575 A1 | 11/2013 | Chen et al. | |
| 2014/0293843 A1* | 10/2014 | Papasakellariou | H04W 72/042 370/280 |

FOREIGN PATENT DOCUMENTS

| | | |
|---|---|---|
| CN | 101505498 A | 8/2009 |
| EP | 0631397 A2 | 12/1994 |
| EP | 1367739 A1 | 12/2003 |
| EP | 1605605 A2 | 12/2005 |
| EP | 1811683 A2 | 7/2007 |
| EP | 1811685 A2 | 7/2007 |
| EP | 1912345 A1 | 4/2008 |
| EP | 2293618 A1 | 3/2011 |
| JP | 2005-167963 A | 6/2005 |
| JP | 2006-014304 A | 1/2006 |
| JP | 2008236675 A | 10/2008 |
| JP | 2011-514035 A | 4/2011 |
| JP | 2011-515997 A | 5/2011 |
| JP | 2012-516608 A | 7/2012 |
| JP | 2013-504921 A | 2/2013 |
| JP | 5205456 B2 | 6/2013 |
| RU | 2251220 C2 | 4/2005 |
| RU | 2267222 C2 | 12/2005 |
| RU | 2006-108531 A | 7/2006 |
| RU | 2297733 C2 | 4/2007 |
| RU | 2011102436 A | 7/2012 |
| TW | 200618508 A | 6/2006 |
| TW | 200838188 A | 9/2008 |
| WO | WO 01/61884 A1 | 8/2001 |
| WO | WO 03/003593 A2 | 1/2003 |
| WO | WO 2004/056009 A1 | 7/2004 |
| WO | WO 2005/018125 A1 | 2/2005 |
| WO | WO 2006/095224 A1 | 9/2006 |
| WO | WO 2006/096789 A1 | 9/2006 |
| WO | WO 2008/042187 A2 | 4/2008 |
| WO | WO 2008/055235 A2 | 5/2008 |
| WO | WO 2008/101053 A2 | 8/2008 |
| WO | WO 2008/109162 A2 | 9/2008 |
| WO | WO 2008/155469 A1 | 12/2008 |
| WO | WO 2009/099271 A1 | 8/2009 |
| WO | WO 2010/065759 A2 | 6/2010 |
| WO | WO 2010/091425 A2 | 8/2010 |
| WO | WO 2010/135697 A2 | 11/2010 |
| WO | WO 2010/150552 A1 | 12/2010 |

OTHER PUBLICATIONS

MCC Support, "Final Report of 3GPP TSG RAN WG1 #60bis v1.0.0 (Beijing, China, Apr. 12-16, 2010)," R1-102601, 3GPP TSG RAN WG1 Meeting #61, Montreal, Canada, May 10-14, 2010.

MCC Support, "Final Report of 3GPP TSG RAN WG1 #61, v3.0.0 (Montreal, Canada, May 10-14, 2010)," R1-104183, 3GPP TSG RAN WG1 Meeting #61bis, Dresden, Germany, Jun. 28-Jul. 2, 2010.

RAN4, "LS Reply on Uplink Power Control in LTE-A," R1-101715, 3GPP TSG-RAN WG1 Meeting #60bis, Beijing, China, Apr. 12-16, 2010.

Research in Motion UK Limited, "Uplink Power Control for Carrier Aggregation," R1-093297, 3GPP TSG RAN WG1 Meeting #58, Shenzhen, China, Aug. 24-28, 2009.

Samsung, "Concurrent PUSCH and PUCCH Transmissions," 3GPP TSG RAN WG1 #56bis, R1-091248 (Mar. 23-27, 2009).

Third Generation Partnership Project, "Technical Specification Group Radio Access Network; Evolved Universal Terrestrial Radio Access (E-UTRA) Medium Access Control (MAC) Protocol Specification (Release 8)," 3GPP TS 36.321 v8.7.0, Sep. 2009.

Third Generation Partnership Project, "Technical Specification Group Radio Access Network; Evolved Universal Terrestrial Radio Access (E-UTRA) Medium Access Control (MAC) Protocol Specification (Release 8)," 3GPP TS 36.321 v8.9.0, Jun. 2010.

Third Generation Partnership Project, "Technical Specification Group Radio Access Network; Evolved Universal Terrestrial Radio Access (E-UTRA) Medium Access Control (MAC) Protocol Specification (Release 9)," 3GPP TS 36.321 v9.0.0, Sep. 2009.

(56) References Cited

OTHER PUBLICATIONS

Third Generation Partnership Project, "Technical Specification Group Radio Access Network; Evolved Universal Terrestrial Radio Access (E-UTRA) Medium Access Control (MAC) Protocol Specification (Release 9)," 3GPP TS 36.321 v9.3.0, Jun. 2010.
Third Generation Partnership Project, "Technical Specification Group Radio Access Network; Evolved Universal Terrestrial Radio Access (E-UTRA); Physical Layer Procedures (Release 8)," 3GPP TS 36.213 v8.8.0, Sep. 2009.
Third Generation Partnership Project, "Technical Specification Group Radio Access Network; Evolved Universal Terrestrial Radio Access (E-UTRA); Physical Layer Procedures (Release 9)," 3GPP TS 36.213 v9.2.0, Jun. 2010.
Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 v8.7.0, Sep. 2009.
Third Generation Partnership Project, "Technical Specification Group Radio Access Network; Evolved Universal Terrestrial Radio Access (E-UTRA) Radio Resource Control (RRC); Protocol Specification (Release 8)," 3GPP TS 36.331 v8.10.0, Jun. 2010.
Third Generation Partnership Project, "Technical Specification Group Radio Access Network; Evolved Universal Terrestrial Radio Access (E-UTRA) Radio Resource Control (RRC); Protocol Specification (Release 9)," 3GPP TS 36.331 v9.0.0, Sep. 2009.
Third Generation Partnership Project, "Technical Specification Group Radio Access Network; Evolved Universal Terrestrial Radio Access (E-UTRA) Radio Resource Control (RRC); Protocol Specification (Release 9)," 3GPP TS 36.331 v9.3.0, Jun. 2010.
Third Generation Partnership Project, "Technical Specification Group Radio Access Network; Evolved Universal Terrestrial Radio Access (E-UTRA); Requirements for Support of Radio Resource Management (Release 8)," 3GPP TS 36.133 v8.7.0, Sep. 2009.
Third Generation Partnership Project, "Technical Specification Group Radio Access Network; Evolved Universal Terrestrial Radio Access (E-UTRA); Requirements for Support of Radio Resource Management (Release 8)," 3GPP TS 36.133 v8.10.0, Jun. 2010.
Third Generation Partnership Project, "Technical Specification Group Radio Access Network; Evolved Universal Terrestrial Radio Access (E-UTRA); Requirements for Support of Radio Resource Management (Release 9)," 3GPP TS 36.133 v9.1.0, Sep. 2009.
Third Generation Partnership Project, "Technical Specification Group Radio Access Network; Evolved Universal Terrestrial Radio Access (E-UTRA); Requirements for Support of Radio Resource Management (Release 9)," 3GPP TS 36.133 v9.4.0, Jun. 2010.
Third Generation Partnership Project, "Technical Specification Group Radio Access Network; Further Advancements for E-UTRA Physical Layer Aspects (Release 9)," 3GPP TR 36.814 v1.0.0, Feb. 2009.
Third Generation Partnership Project, "Technical Specification Group Radio Access Network; Further Advancements for E-UTRA Physical Layer Aspects (Release 9)," 3GPP TR 36.814 v9.0.0, Mar. 2010.
Third Generation Partnership Project, "Technical Specification Group Radio Access Network; Evolved Universal Terrestrial Radio Access (E-UTRA); Requirements for Support of Radio Resource Management (Release 9)," 3GPP TS 36.133 v8.10.0, Jun. 2010.
3rd Generation Partnership Project (3GPP), R1-081464, "Triggers for Power Headroom Reports in EUTRAN Uplink", 3GPP TSG RAN WG1 Meeting #52bis, Nokia Siemens Networks, Nokia, Shenzhen, China, Mar. 31-Apr. 4, 2008, 2 pages.
3rd Generation Partnership Project (3GPP), R1-082468, "Carrier aggregation in LTE-Advanced", 3GPP TSG-RAN WG1 #53bis, Warsaw, Poland, Jun. 30-Jul. 4, 2008, 6 pages.
3rd Generation Partnership Project (3GPP), R1-082807, "CM Analysis of UL Transmission for LTE-A", 3GPP TSG-RAN WG1 Meeting #54, InterDigital Communications , LLC, Jeju, Korea, Aug. 18-22, 2008, 8 pages.
3rd Generation Partnership Project (3GPP), R1-084398, "Aspects to consider for DL transmission schemes of LTE-A", 3GPP TSG-RAN WG1 #55, Qualcomm Europe, Prague, Czech Republic, Nov. 10-14, 2008, 11 pages.
3rd Generation Partnership Project (3GPP), R1-090234, "UL control signalling to support bandwidth extension in LTE Advanced", 3GPP TSG RAN WG1 Meeting #55bis, Nokia Siemens Networks, Nokia, Ljubljana, Slovenia, Jan. 12-16, 2009, 5 pages.
3rd Generation Partnership Project (3GPP), R1-090362, "Support of Concurrent Transmission of PUCCH and PUSCH in LTE-A Uplink", Qualcomm Europe, 3GPP TSG RAN WG1 #55bis, Ljubljana, Slovenia, Jan. 12-16, 2009, 3 pages.
3rd Generation Partnership Project (3GPP), R1-090363, "CM Analysis of Concurrent PUSCH and PUCCH UL transmission for LTE-A", 3GPP TSG RAN WG1 #55bis, Qualcomm Europe, Ljubljana, Slovenia, Jan. 12-16, 2009, 7 pages.
3rd Generation Partnership Project (3GPP), R1-090430, "Alignment of RAN1/RAN4 specification on UE maximum output power", 3GPP TSG-RAN WG1 Meeting #55bis, LG Electronics, Ericsson, Panasonic, NTT DOCOMO, Nokia Siemens Network, Nokia, Ljubljana, Slovenia, Jan. 12-16, 2009, 9 pages.
3rd Generation Partnership Project (3GPP), R1-090544,"Text Proposal for TR36.814 on Uplink Transmission Scheme", TSG-RAN WG1 Meeting #55bis, Ericsson, Ljubljana, Slovenia, Jan. 12-16, 2009, 2 pages.
3rd Generation Partnership Project (3GPP), R1-090611, "Concurrent PUSCH and PUCCH Transmissions", 3GPP TSG RAN WG1 #56, Samsung, Athens, Greece, Feb. 9-13, 2009, 2 pages.
3rd Generation Partnership Project (3GPP), R1-090654, "PUCCH piggybacking onto PUSCH in case of transmit power limitation", 3GPP TSG RAN WG1 #56, LG Electronics, Athens, Greece, Feb. 9-13, 2009, 5 pages.
3rd Generation Partnership Project (3GPP), R1-090655, "Uplink multiple channel transmission in case of UE transmit power limitation", 3GPP TSG RAN WG1#56, LG Electronics, Athens, Greece, Feb. 9-13, 2009, 3 pages.
3rd Generation Partnership Project (3GPP), R1-090738, "PUSCH Power Control for LTE-Advanced", 3GPP TSG RAN WG1 #56 Meeting, Nokia Siemens Networks, Nokia, Athens, Greece, Feb. 9-13, 2009, 4 pages.
3rd Generation Partnership Project (3GPP), R1-092415, "Uplink Power Control for Carrier Aggregation", 3GPP TSG RAN WG1 Meeting #57b, Research in Motion, UK Limited, Los Angeles, USA, Jun. 29-Jul. 3, 2009, 3 pages.
3rd Generation Partnership Project (3GPP), R1-092574, "PUSCH Power Control for LTE-Advanced", 3GPP TSG RAN WG1 #57bis Meeting, Nokia Siemens Networks, Nokia, Los Angeles, CA, USA, Jun. 29-Jul. 3, 2009, 4 pages.
3rd Generation Partnership Project (3GPP), R1-092670, "UL Transmission Power Control in LTE-A", 3GPP TSG RAN WG1 #57bis, Samsung, Los Angeles, USA, Jun. 29-Jul. 3, 2009, 5 pages.
3rd Generation Partnership Project (3GPP), R1-092983, "LS on Power Amplifier configurations for UEs with multiple transmit antennas", 3GPP TSG-WG1 #57bis, Qualcomm Europe, Los Angeles, USA, Jun. 29-Jul. 3, 2009, 2 pages.
3rd Generation Partnership Project (3GPP), R1-093070, "Proposed Way Forward on UL Power Control for LTE-A Bandwidth Extension" 3GPP TSG-RAN WG1 Meeting #58, InterDigital Communications, LLC, Shenzhen, China, Aug. 24-28, 2009, 3 pages.
3rd Generation Partnership Project (3GPP), R1-094274, "Uplink Power Control for Carrier Aggregation" 3GPP TSG RAN WG1 Meeting #58bis, Ericsson, ST Ericsson, Miyazaki, Japan, Oct. 12-16, 2009, 4 pages.
3rd Generation Partnership Project (3GPP), R1-100071, "Considerations on Uplink Power Control in LTE-Advanced", 3GPP TSG RAN WG1 meeting #59bis, CATT, Valencia, Spain, Jan. 18-22, 2010, pp. 1-3.
3rd Generation Partnership Project (3GPP), R2 085326, "Considering about PHR", Discussion and Decision, 3GPP TSG RAN WG2 #63bis, CATT, Sep. 29-Oct. 3, 2008, 6 pages.
3rd Generation Partnership Project (3GPP), TR 36.814 V1.5.0, "3rd Generation Partnership Project; Technical Specification Group

(56) References Cited

OTHER PUBLICATIONS

Radio Access Network; Further Advancements for E-UTRA Physical Layer Aspects (Release 9)", Nov. 2009, 53 pages.
3rd Generation Partnership Project (3GPP), TS 25.101 V8.5.1, "3rd Generation Partnership Project; Technical Specification Group Radio Access Network; User Equipment (UE) Radio Transmission and Reception (FDD) (Release 8)", Jan. 2009, 214 pages.
3rd Generation Partnership Project (3GPP), TS 25.101 V8.9.0, "3rd Generation Partnership Project; Technical Specification Group Radio Access Network; User Equipment (UE) Radio Transmission and Reception (FDD) (Release 8)", Dec. 2009, 217 pages.
3rd Generation Partnership Project (3GPP), TS 25.101 V9.2.0, "3rd Generation Partnership Project; Technical Specification Group Radio Access Network; User Equipment (UE) Radio Transmission and Reception (FDD) (Release 9)", Dec. 2009, 244 pages.
3rd Generation Partnership Project (3GPP), TS 36.213 V8.5.0, "3rd Generation Partnership Project; Technical Specification Group Radio Access Network; Evolved Universal Terrestrial Radio Access (E-UTRA); Physical Layer Procedures (Release 8)", Dec. 2008, 74 pages.
3rd Generation Partnership Project (3GPP), TS 36.213, V9.0.1, "3rd Generation Partnership Project; Technical Specification Group Radio Access Network; Evolved Universal Terrestrial Radio Access (E-UTRA); Physical Layer Procedures (Release 9)", Dec. 2009, 79 pages.
3rd Generation Partnership Project (3GPP), TS 36.321 V8.3.0, "3rd Generation Partnership Project; Technical Specification Group Radio Access Network; Evolved Universal Terrestrial Radio Access (E-UTRA) Medium Access Control (MAC) Protocol Specification (Release 8)", Sep. 2008, 36 pages.
3rd Generation Partnership Project (3GPP), TS 36.321 V8.8.0, "3rd Generation Partnership Project; Technical Specification Group Radio Access Network; Evolved Universal Terrestrial Radio Access (E-UTRA) Medium Access Control (MAC) Protocol Specification (Release 8)", Dec. 2009, 47 pages.
3rd Generation Partnership Project (3GPP), TS 36.321 V9.1.0, "3rd Generation Partnership Project; Technical Specification Group Radio Access Network; Evolved Universal Terrestrial Radio Access (E-UTRA) Medium Access Control (MAC) Protocol Specification (Release 9)", Dec. 2009, 48 pages.
3rd Generation Partnership Project (3GPP), TS 36.331 V8.4.0, "3rd Generation Partnership Project (3GPP); Technical Specification Group Radio Access Network; Evolved Universal Terrestrial Radio Access (E-UTRA) Radio Resource Control (RRC); Protocol Specification (Release 8)", Dec. 2008, 198 pages.
3rd Generation Partnership Project (3GPP), TS 36.331 V9.1.0, "3rd Generation Partnership Project; Technical Specification Group Radio Access Network; Evolved Universal Terrestrial Radio Access (E-UTRA) Radio Resource Control (RRC); Protocol Specification (Release 9)", Dec. 2009, 233 pages.
3rd Generation Partnership Project (3GPP); TS 36.321 V8.4.0, 3rd Generation Partnership Project; Technical Specification Group Radio Access Network; Evolved Universal Terrestrial Radio Access (E-UTRA) Medium Access Control (MAC) Protocol Specification (Release 8), Dec. 2008, 43 pages.
European Telecommunications Standards Institute (ETSI), TS 136 213 V8.4.0, "LTE; Evolved Universal Terrestrial Radio Access (E-UTRA); Physical Layer Procedures (3GPP TS 36.213 version 8.4.0 Release 8", Nov. 2008, 62 pages.
Jia, Shen et al., "3GPP Long Term Evolution: Principle and System Design", Section 3.4.2, Posts and Telecom Press, Nov. 2008, pp. 111-114.
3rd Generation Partnership Project (3GPP), TS 36.213 V8.4.0, "Technical Specification Group Radio Access Network, Evolved Universal Terrestrial Radio Access (E-UTRA), Physical Layer Procedures (Release 8)", Sep. 2008, pp. 1-60.
3rd Generation Partnership Project (3GPP), TW36.213 V10.0.0, "3rd Generation Partnership Project; Technical Specification Group Radio Access Network; Evolved Universal Terrestrial Radio Access (E-UTRA); Physical layer procedures (Release 10)", Dec. 2010, pp. 1-98.
3rd Generation Partnership Project (3GPP), R1-084702, "To Fix the Discrepancy of Uplink Power Control and Channel Coding of Control information in PUSCH", Motorola, 3GPP TSG-RAN1, Meeting #55, Prague, Czech, Nov. 10-14, 2008, 2 pages.
3rd Generation Partnership Project (3GPP), R1-094470, "Uplink power control in LTE-Advanced", LG Electronics, 3GPP TSG RAN WG1, Meeting # 59, Jeju, Korea, Nov. 9-13, 2009, 5 pages.

\* cited by examiner

DETERMINING POWER HEADROOM IN A WIRELESS NETWORK

CROSS REFERENCE TO RELATED APPLICATIONS

This application claims the benefit of U.S. provisional application Nos. 61/247,676 filed on Oct. 1, 2009; 61/248,373 filed on Oct. 2, 2009; 61/285,343 filed on Dec. 10, 2009; 61/329,194 filed on Apr. 29, 2010; and 61/356,472 filed on Jun. 18, 2010, the contents of which are hereby incorporated by reference herein.

FIELD OF THE INVENTION

This application is related to wireless communications.

BACKGROUND

Transmit power of a wireless transmit/receive unit (WTRU) may be determined in the WTRU based on measurements made by the WTRU and data received from an evolved NodeB (eNodeB). The WTRU transmit power control may be used for maintaining quality of service (QoS), controlling intercell interference, maximizing a WTRU's battery life and the like.

In Third Generation Partnership Project (3GPP) long term evolution (LTE), uplink (UL) power control may be used to compensate for long-term fading, (including path loss and shadowing), while reducing inter-cell interference, and avoiding occurrences of the WTRU having to invoke its maximum power procedure to prevent its power amplifier (PA) from operating beyond its linear region and/or to prevent the WTRU from exceeding maximum transmit power limits imposed by the network, regulatory requirements, and the like. LTE power control methods may include combined open loop and closed loop power control methods. In LTE Release 8 (R8) and 9 (R9), the WTRU transmits on a single carrier over one antenna which may be accomplished with one power amplifier (PA). Open and closed loop power control related data are exchanged between the eNodeB and the WTRU for the single transmit path.

In LTE R8 and R9, power headroom may be used for assisting the eNodeB to schedule the UL transmission resources of different WTRUs. In LTE, power headroom, reported from the WTRU to the eNodeB, is the difference between the nominal WTRU maximum transmit power and the estimated power for PUSCH transmission for the single carrier. Maximum transmit power imposed by the network for the single carrier is signaled by the eNodeB to the WTRU in system information. Additional limits such as the WTRU's power class, its PA capabilities, and the like, may reduce the maximum transmit power used by the WTRU for the headroom calculation.

LTE R8 and R9 methods for calculating and signaling power headroom and other power control related data may not be sufficient to support multiple component carriers (CCs) which may require multiple WTRU PAs.

SUMMARY

Methods and apparatus for power control are described. Methods are included for calculating and signaling power control related data to support multiple component carriers (CCs) for which transmission may be accomplished with one or more WTRU power amplifiers (PAs).

Methods are included for calculating and signaling one or more of CC-specific power control related data and PA-specific power control related data. The power control related data may include one or more of maximum power, power headroom, and transmit power. Methods for selecting which power control related data to exchange are included. Methods are included for calculating and signaling power control related data for physical UL shared channel (PUSCH), physical UL control channel (PUCCH), and simultaneous PUSCH and PUCCH transmission.

BRIEF DESCRIPTION OF THE DRAWINGS

A more detailed understanding may be had from the following description, given by way of example in conjunction with the accompanying drawings wherein.

DETAILED DESCRIPTION

Figure 1A:
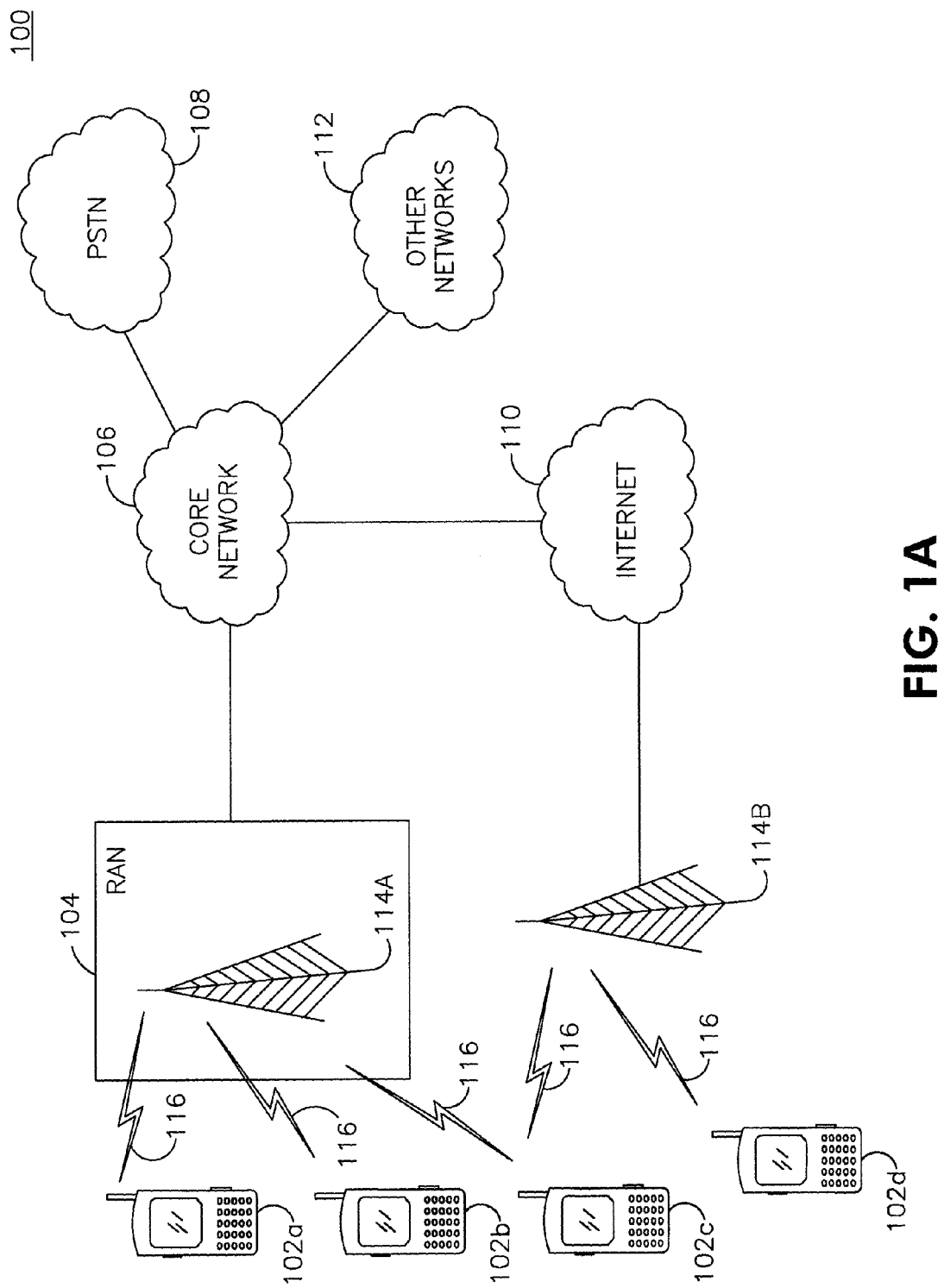
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
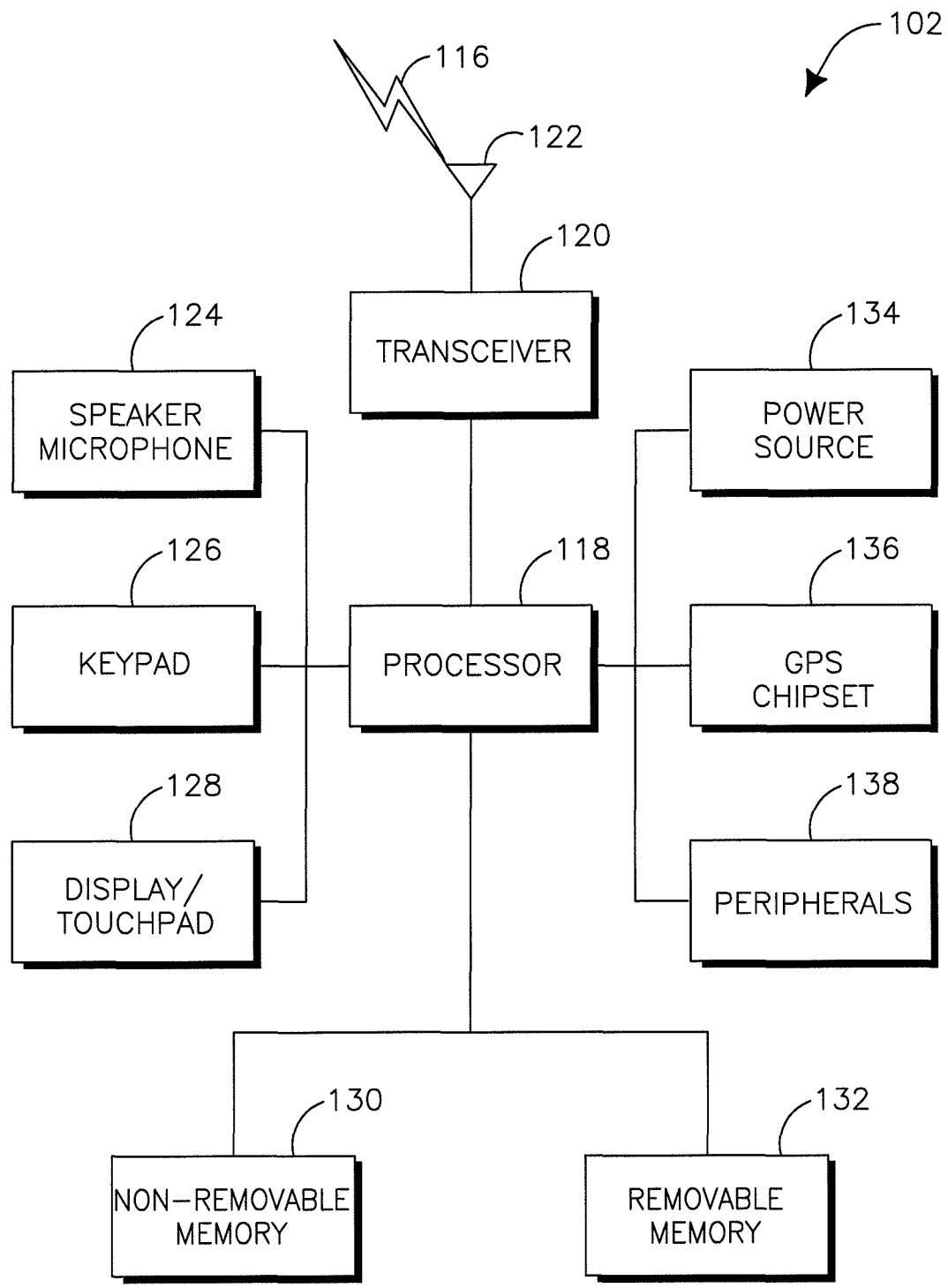
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
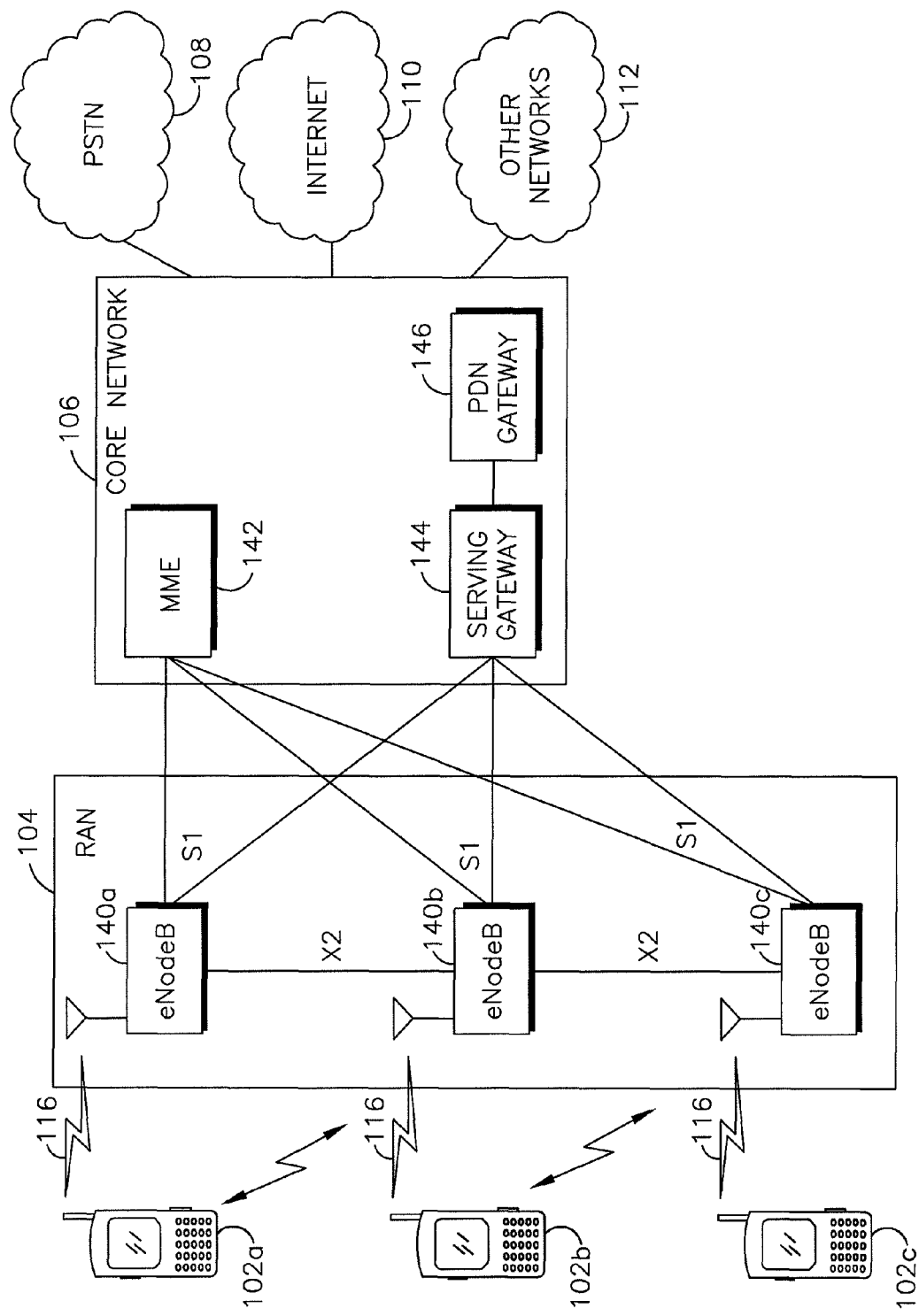
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116, though it will be appreciated that the disclosed embodiments contemplate any number of WTRUs, base stations, networks, and/or network elements. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In LTE Release 8 (R8), a WTRU reports (i.e., signals or transmits) power headroom (PH) for one carrier to the base station. When conditions warrant the WTRU sending a PH report (PHR), the WTRU waits until a transmission interval (TTI) for which the WTRU receives a valid uplink (UL) physical uplink shared channel (PUSCH) grant, i.e., UL resources, and then sends the PHR in that TTI.

In LTE-A, a WTRU may report power headroom for one, two or more component carriers (CCs) to the eNodeB. When conditions warrant the WTRU may send a PHR for at least one UL CC, PHRs for all active UL CCs, or PHRs for all configured UL CCs, for example if there is no explicit activation mechanism, and even if there is no UL grant for the specific TTI for a given UL CC. For the UL CCs which do not have a PUSCH grant, the WTRU may use a reference format or grant (i.e., a set of grant parameters known to both the WTRU and the base station) to derive the PH for that UL CC. Consequently, the WTRU may report PH for some combination of UL CCs with actual PUSCH grants and reference PUSCH grants. UL CCs with actual grants in a given TTI are referred to herein as real CCs or transmitted CCs. UL CCs that do not have actual grants, and may use reference grants, for the PH calculation are referred to herein as fake or virtual CCs.

The base station may use the PHRs from WTRUs in deciding how to schedule UL resources in the future for these WTRUs. Due to the possibility of transmission on multiple CCs which may be implemented in the WTRU with one or more PAs, the base station may not have enough information to make appropriate scheduling decisions using the existing PH calculations and reports.

In another aspect of LTE-A, a WTRU supporting UL transmission over multiple antenna ports may operate in multi-antenna port mode in which it may transmit over multiple antenna ports or single antenna port mode in which it may transmit over one antenna port. While in multi-antenna port mode, the base station may dynamically signal the WTRU to switch between the configured transmission scheme of the transmission mode and a single-antenna port scheme in which the WTRU may only transmit over one antenna port. Switching to the single-antenna port scheme is referred to herein as fallback. For each PUSCH transmission, the signaled UL grant from the base station may direct the WTRU to use either the transmission scheme of the configured transmission mode or the single-antenna port fallback scheme. Power headroom may be different upon such change. In accordance with existing R8 reporting rules, the WTRU may not report such a change until the next periodic power headroom report, which may be too far in the future to enable the base station to make appropriate scheduling choices for the current transmission scheme.

Described herein are power control methods and apparatus for LTE Release 10 (R10) or LTE-A that may address bandwidth extension using carrier aggregation, multiple CCs, multiple power amplifiers, uplink multiple-input multiple-output (UL MIMO), simultaneous PUSCH and physical uplink control channel (PUCCH) transmission, and fallback. The methods include associating CCs with PAs, and configuring and reporting power control parameters related to the CCs and PAs; power headroom reporting for PUSCH, PUCCH, and simultaneous PUSCH and PUCCH transmissions; and computing and reporting power headroom to enable the base station to make informed scheduling decisions. Each of the example methods presented may be used individually or in combination with any one or more of the other example methods.

In the examples described below, the mapping of CCs to PAs may be known by both the WTRU and the base station. If the mapping of CCs to PAs for a WTRU is determined in the base station, the base station may signal the mapping of (J) CCs to (K) PAs to the WTRU. Alternatively, if the mapping of CCs to PAs for a WTRU is determined in the WTRU, the WTRU may signal the mapping of (J) CCs to (K) PAs to the base station. Alternatively, the mapping may be derived by both the WTRU and the base station based on known, defined or pre-established configurations (e.g., by WTRU category and frequency band). The number of the PAs at the WTRU may be derived by the base station implicitly from the WTRU category information (or other indicator) signaled by the WTRU (e.g., as part of the WTRU capability information). Alternatively, the WTRU may explicitly signal the number of the PAs and their characteristics, (e.g., maximum transmit power) to the base station.

In certain of the examples described below, the WTRU may signal power control data to the eNodeB for one or more (J) CCs using one or more (K) PAs. To illustrate such a mapping, consider the following mapping example between WTRU CCs and PAs as shown in Table 1 below. Three CCs are transmitted using two PAs, (i.e., K=2 and J=3), band CC#1 is transmitted by PA#1 and CC#2 and CC#3 are transmitted by PA#2.

TABLE 1

| CC | PA |
|----|----|
| 1  | 1  |
| 2  | 2  |
| 3  |    |

In the examples described herein, $P_{CC}(i,j)$ represents the required UL transmit power determined by the WTRU for CCj in subframe i before any reduction for a maximum power limitation.

Described herein is an example method for signaling CC-specific maximum power. In the example method, the base station may signal $P_{Max}$, the parameter used to limit the WTRU's uplink transmission power on a carrier frequency, on a per CC basis to the WTRU. For J CCs, this requires J such values, denoted $P_{Max}(j)$ or P-Max(j).

In further examples described herein $P_{Max}(j)$ and P-Max(j) may be used interchangeably to represent the CC specific maximum transmit power value signaled to the WTRU for each CCj. $P_{CMAX}(j)$ is used to represent the CC specific maximum transmit power value for CCj, which may take into account one or more of the signaled maximum power value, $P_{Max}(j)$, the maximum power of the WTRU power class, maximum power reduction allowances, tolerances, and the like. $P_{CMAX}(j)$ may be referred to as the configured maximum power, configured maximum transmit power, or configured maximum output power for the CC.

Described herein are example methods for signaling and/or determining PA-specific maximum power. In an example method, each PA k may have a maximum transmit power capability, denoted $P_{AMAX}(k)$, that may be determined by the WTRU. $P_{AMAX}(k)$ may be an attribute of the WTRU category. Separate maximum power transmit capability for each PA may be signaled by the WTRU to the base station. For K PAs, this requires K maximum transmit power capabilities. Alternatively, both the WTRU and the base station may derive the PA specific maximum transmit power capability based on the WTRU category (or other indicator) reported to the base station by the WTRU in a WTRU capability information element. Additionally, the base station may signal a substitute PA-specific maximum transmit power capability to the WTRU. The substitute PA-specific maximum transmit power capability may be a value different from the PA property value that may be signaled from the WTRU to the base station as stated above. This may require the WTRU to operate as though the PA had the substitute maximum transmit power capability. The substitute maximum transmit power capability may be less than the maximum transmit power capability which is the property of the PA.

Described herein are example methods for signaling and/or determining CC-specific power headroom and/or PA-specific power headroom. In an example method, separate power headroom reports for each CC and PA may be signaled to the base station by the WTRU. For J CCs and K PAs, this may require J+K headroom reports. The CC power headroom may be the difference between the CC maximum transmit power and the required transmit power for all physical uplink shared channel (PUSCH) transmissions on the CC. The PA power headroom may be the difference between the PA maximum transmit power and the required transmit power for all PUSCH transmissions at the PA.

Alternatively, the WTRU may signal the power headroom reports for the J CCs and the base station may derive the K PA headroom values based on the CCs to PAs mapping, the CC headroom reports, P-Max(j) for each CC_j, and the PA-specific maximum transmit power.

Described herein is an example method for signaling CC-specific transmit power and PA-specific transmit power. In the example method, separate transmit powers for each CC and PA may be signaled to the base station by the WTRU. For J CCs and KP As, this may require J+K transmit power reports. The headroom for CC j in subframe i, denoted $P_{HCC}(i,j)$, may be determined by the base station from the CC transmit powers as:

$$P_{HCC}(i,j)=P\text{-Max}(j)-P_{CC}(i,j), \qquad \text{Equation (1)}$$

where $P_{CC}(i,j)$ is the required transmit power for PUSCH transmission in CC(j) in subframe i.

The headroom for PA k in subframe i, denoted $P_{HPA}(i,k)$, may be determined by the base station from the PA transmit powers as:

$$P_{HPA}(i,k)=P_{AMAX}(k)-P_{PA}(i,k) \qquad \text{Equation (2)}$$

where $P_{PA}(i,k)$ is the required transmit power for all PUSCH transmissions in PA(k) in subframe i.

Described herein is a method for reporting headroom or transmit power. In the example method, the base station may configure the WTRU as to whether transmit power and/or power headroom is reported by the WTRU. The transmit power and/or power headroom may be CC specific and/or PA specific.

Described herein is a method for signaling CC-specific transmit power. In the example method, the WTRU may signal CC-specific transmit power to the base station and the base station may determine, from the CC-specific transmit powers, the PA-specific headroom. The WTRU may not need to explicitly signal the PA transmit power or headroom. This may require J rather than J+K transmit power reports, and may reduce the signaling overhead. The PA headroom for PA k in subframe i, denoted $P_{HPA}(i,k)$, may be determined from the CC transmit powers and the CC to PA mapping. Using the CC to PA mapping example provided earlier:

$$P_{HPA}(i,1)=P_{AMAX}(1)-P_{CC}(i,1), \text{ and} \qquad \text{Equation (3)}$$

$$P_{HPA}(i,2)=P_{AMAX}(2)-(P_{CC}(i,1)+P_{CC}(i,2)). \qquad \text{Equation (4)}$$

and the headroom for the CCs, denoted $P_{HCC}(i,j)$, may be determined by the base station using Equation 1, copied below for convenience:

$$P_{HCC}(i,j)=P\text{-Max}(j)-P_{CC}(i,j), \qquad \text{Equation (1)}$$

Described herein are example methods for transmit power and/or power headroom reporting for simultaneous PUSCH/PUCCH transmissions. In LTE, PUCCH and PUSCH are transmitted in different subframes in order to primarily preserve the single carrier property in UL transmission. In addition, the LTE WTRU reports power headroom based on the PUSCH transmit power. LTE-A, however, may support, simultaneous PUSCH and PUCCH transmissons, where a single WTRU-specific UL CC is configured semi-statically for carrying PUCCH. When simultaneous PUSCH/PUCCH transmission occurs in a subframe (on a CC), the maximum transmit power available for the PUSCH transmission may be reduced by the transmit power allocated to the PUCCH transmission. In this case, it may be desirable to include the PUCCH transmit power value in the transmit power and/or power headroom reporting, since the PUCCH transmission directly affects the power headroom available for PUSCH. In the example methods described herein, the WTRU may take PUCCH transmit power into account when reporting to the base station the WTRU's power headroom or transmit power in which simultaneous PUSCH and PUCCH transmission occurs on a CC.

In one example method, if simultaneous PUSCH and PUCCH transmission occurs on CC j, the transmit power and/or headroom of PUSCH and PUCCH may be combined. For transmit power reporting the WTRU may report:

$$P_{CC}(i,j)=P_{CC\_PUSCH}(i,j)+P_{CC\_PUCCH}(i,j), \qquad \text{Equation (5)}$$

where $P_{CC\_PUCCH}(i,j)$ may be the required transmit power for PUSCH on CC j in subframe i (i.e., the PUSCH power before any reduction for a maximum power limitation) and $P_{CC\_PUCCH}(i,j)$ may be the required transmit power for PUCCH on CC j in subframe i (i.e., the PUCCH power before any reduction for a maximum power limitation). If in subframe i (where PUSCH power headroom may be reported), PUCCH is not present, then the latest required transmit power for PUCCH (i.e., latest PUCCH transmission) on CC j may used for $P_{CC\_PUCCH}(i,j)$. Alternatively, the downlink control information (DCI) format used for the latest PUCCH transmission may be used to derive $P_{CC\_PUCCH}(i,j)$. Alternatively, a reference DCI format (e.g., DCI format 1a) may be used to derive $P_{CC\_PUCCH}(i,j)$.

For power headroom (PH) reporting, the WTRU may report:

$$P_{HCC}(i,j) = P_{CMAX}(j) - 10*\log10\left\{10^{\frac{P_{CC\_PUSCH}(i,j)}{10}} + 10^{\frac{P_{CC\_PUCCH}(i,j)}{10}}\right\}, \quad \text{Equation (6)}$$

where $P_{CMAX}(j)$ may be the configured maximum power for CC j, (e.g., carrier specific maximum transmit power) as described earlier. If in subframe i (where PUSCH power headroom may be reported), if PUCCH is not present, then the latest required transmit power for PUCCH on CC j may used for $P_{CC\_PUCCH}(i,j)$. Alternatively, the DCI format used for the latest PUCCH transmission may be used to derive $P_{CC\_PUCCH}(i,j)$. Alternatively, a reference DCI format (e.g., DCI format 1a) may be used to derive $P_{CC\_PUCCH}(i,j)$.

On the other CC(s) (l≠j), the WTRU may report the transmit power and/or power headroom of PUSCH. For transmit power reporting, the WTRU may report $P_{CC}(i,l)=P_{CC\_PUSCH}(i,l)$ and for power headroom reporting, the WTRU may report $P_{HCC}(i,l)=P_{CMAX}(l)-P_{CC\_PUSCH}(i,l)$.

In another example method, the WTRU may separately/individually report transmit power and/or power headroom reports for PUSCH and PUCCH. For transmit power reporting, the WTRU may report: $P_{CC\_PUSCH}(i,j)$ and $P_{CC\_PUCCH}(i,j)$. For power headroom reporting, the WTRU may report:

$$P_{HCC\_PUSCH}(i,j)=P_{CMAX}(j)-P_{CC\_PUSCH}(i,j); \text{ and} \quad \text{Equation (7)}$$

$$P_{HCC\_PUCCH}(i,j)=P_{CMAX}(j)-P_{CC\_PUCCH}(i,j), \quad \text{Equation (8)}$$

where $P_{HCC\_PUSCH}(i,j)$ and $P_{HCC\_PUCCH}(i,j)$ may represent the power headroom reports for PUSCH and PUCCH, respectively, and PUCCH is transmitted on CC j. If in subframe i, (where PUSCH power headroom may be reported), if PUCCH is not present, then the latest required transmit power for PUCCH on CC j may be used for $P_{CC\_PUCCH}(i,j)$. Alternatively, the DCI format used for the latest PUCCH transmission may be used to derive $P_{CC\_PUCCH}(i,j)$. Alternatively, a reference DCI format (e.g., DCI format 1a) may be used to derive $P_{CC\_PUCCH}(i,j)$. For the other CC(s) (l≠j), the WTRU may report the transmit power and/or power headroom of PUSCH on the CC.

In another example method, the WTRU may separately report transmit power and/or power headroom for PUSCH as in LTE and for the combination of PUSCH and PUCCH if PUCCH is present on the CC (e.g., CC j). For transmit power reporting, the WTRU may report (for subframe i) $P_{CC\_PUSCH}(i,j)$ and $P_{CC}(i,j)$, where $P_{CC}(i,j)=_{CC\_PUSCH}(i,j)+P_{CC\_PUCCH}(i,j)$. For power headroom reporting the WTRU may report $P_{HCC\_PUSCH}(i,j)$, where $P_{HCC\_PUSCH}(i,j)=P_{CMAX}(j)-P_{CC\_PUSCH}(i,j)$ and $P_{HCC}(i,j)$ is as shown in Equation 6 and copied here for convenience:

$$P_{HCC}(i,j) = P_{CMAX}(j) - 10*\log10\left\{10^{\frac{P_{CC\_PUSCH}(i,j)}{10}} + 10^{\frac{P_{CC\_PUCCH}(i,j)}{10}}\right\}, \quad \text{Equation (6)}$$

where $P_{CMAX}(j)$ may be the configured maximum power for CC j, (e.g., carrier specific maximum transmit power) as described earlier.

Described are example methods for transmit power and/or power headroom reporting when there are multiple PUCCHs per CC. For the case of more than one PUCCH within a CC, $P_{CC\_PUCCH}(i,j)$ may be replaced with $$\sum_n P_{CC\_PUCCH}(i,j,n),$$

where there are N instances of PUCCH in CC j in subframe i, denoted as $P_{CC\_PUCCH}(i,j,n)$ for n=0, 1, . . . N−1. Alternatively, there may be separate headroom or transmit power reports for each such PUCCH.

Described are example methods for triggering reports. For simultaneous PUSCH and PUCCH transmission, the power headroom reporting mechanism may be based on timer and/or event triggers. However, the value of the timer and/or event threshold may be different for PUSCH, PUCCH and/or the combination of PUSCH and PUCCH. For a power headroom or transmit power report based on one timer and/or event threshold, the WTRU may report the power headroom or transmit power of the channel which is associated with the given timer or event threshold. Alternatively, the WTRU may report the power headroom or transmit power of both PUSCH and PUCCH once either channel's timer expires or the event threshold is exceeded. Alternatively, the WTRU may report power headroom or transmit power of both PUSCH and PUCCH upon triggers from both channels. Alternatively, the WTRU may report PUCCH power headroom along with PUSCH power headroom whenever PUSCH power headroom reporting is triggered.

With regard to which of the above triggers and reporting methods may be used by a WTRU, it may be specified, configured by the base station for all WTRUs in the cell via a system information block (SIB), or configured by the base station individually for each WTRU in the cell via a radio resource control (RRC) message.

Described herein are example methods for configurable transmit power or power headroom reporting in carrier aggregation situations. The number of PAs with which a WTRU may be equipped may be different depending on WTRU class (or category). In addition, the CC allocation/configuration for a WTRU may be dependent on several factors such as WTRU class, QoS requirement, CC availability, and other like factors. The transmit power or power headroom on a CC may be close to that on other CC(s), for example, in contiguous CC allocation. Therefore in one example method, the base station may configure the WTRU to report transmit power or power headroom per CC, or per group of CCs (like contiguous CCs), or for all active/configured CCs, e.g., based on the carrier aggregation allocation and/or the WTRU PA configuration, and/or some other system parameters.

Alternatively, the WTRU may autonomously determine which transmit power(s) or power headroom(s) is/are reported, e.g., based on a predefined rule. For example, if $|P_{HCC}(i,k)-P_{HCC}(i,n)| \le \epsilon$ where e is a predefined threshold and k≠n, then send only a single power headroom value for both the $k^{th}$ and $n^{th}$ CC.

The above condition implies that if the difference in power headroom between any CCs is small enough (or less than or equal to a predefined value), then the WTRU may not report transmit power(s) or power headroom(s) on all the associated CCs, rather the WTRU may send a single report which represents all of the CCs. For example, this may be done for the case of contiguous CCs. In this case, the WTRU may report a transmit power or power headroom corresponding to a representative CC (e.g., a middle CC or a CC with lowest (or highest) carrier frequency) among the contiguous CCs.

Described herein is an example method for signaling CC-specific power headroom. The example method may compute a CC-specific power headroom, denoted as $P'_{HCC}(i,j)$, and signal the computed CC-specific headroom to a base station. The example method may not compute CC-specific power headroom in the conventional sense, i.e., as the difference between requested (nominal based on last UL grant) and maximum CC-specific transmit power. The notation $P'_{HCC}(i,j)$ may be used to distinguish CC-specific power headroom computed per the example method below from CC-specific power headroom computed in the conventional sense which uses the notation $P_{HCC}(i,j)$. This example method is referred to later as Alternative 1.

The base station may, by using the signaled CC-specific power headroom computed per the example method, schedule grants that avoid exceeding maximum power in the CCs and avoid exceeding maximum power in the PAs. This may be accomplished without the base station having any knowledge of the number of PAs, PA-specific maximum transmit power, PA-specific headroom, CC-to-PA mapping, or the method used for the calculation.

The CC-specific headroom $P'_{HCC}(i,j)$ may be signaled for all J CCs and may require J power headroom reports. Noting that the base station is "unaware" and unaffected that the WTRU is using this method, the CC-specific power headroom $P'_{HCC}(i,j)$ may be signaled as if the value is $P_{HCC}(i,j)$. The trigger for signaling $P'_{HCC}(i,j)$ may be similar to that described for $P_{HCC}(i,j)$, i.e., event based or periodic, where the event is based on the value of $P'_{HCC}(i,j)$ rather than $P_{HCC}(i,j)$.

Figure 2:
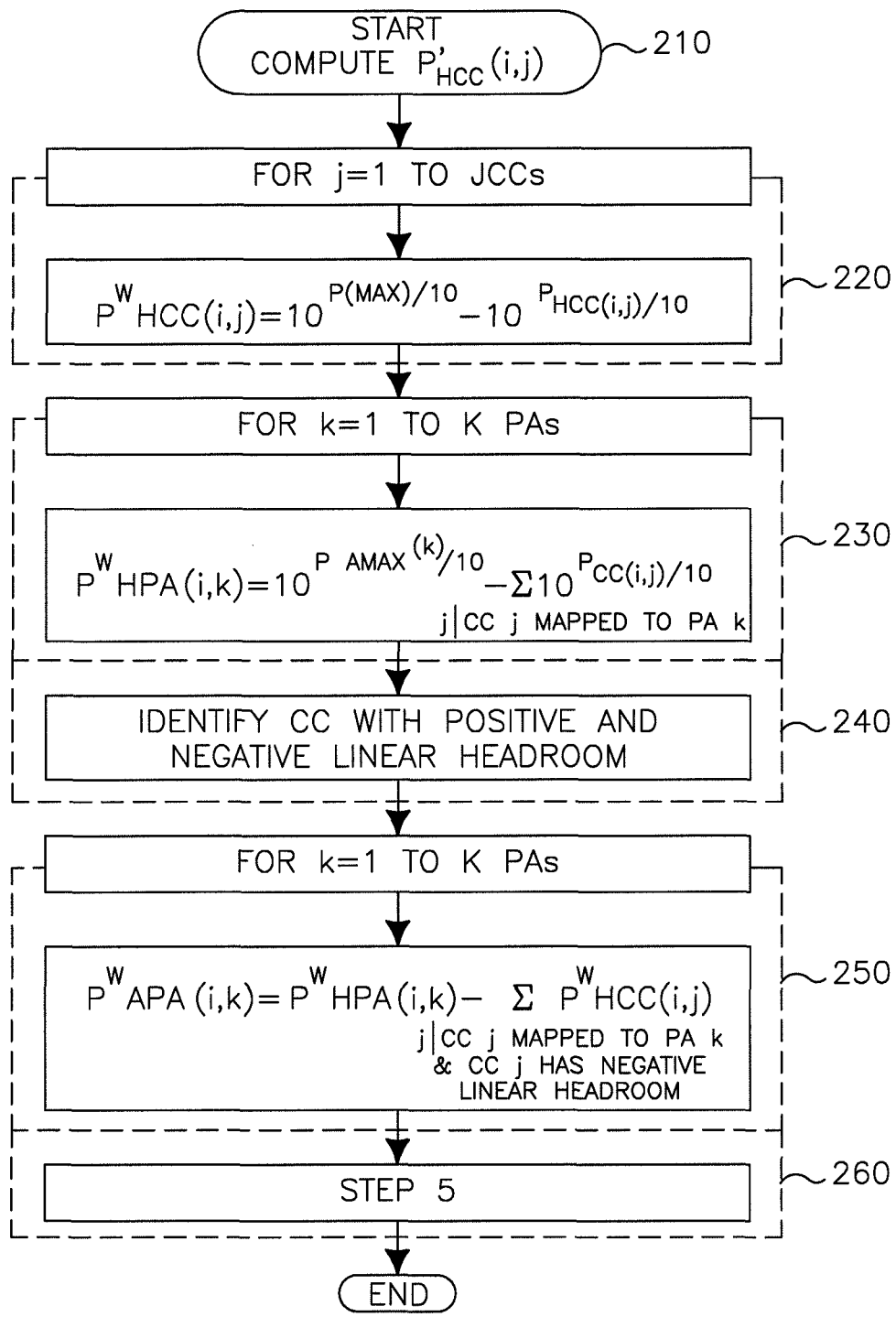
FIGS. 2-4 are example flowcharts of a method of signaling of CC-specific headroom.

Referring to FIG. 2, the WTRU initiates computation of $P'_{HCC}(i,j)$ (210). The power headroom for CC j in subframe i, denoted as $P_{HCC}(i,j)$ [dB], may be determined for all J CCs as described in Equation 1 for PUSCH transmission or for simultaneous PUSCH and PUCCH transmission as described in Equation 6, or some other unspecified criteria for CC-specific power headroom (220). Define $P^w_{HCC}(i,j)$ as $P_{HCC}(i,j)$ in linear rather than dB form, as:

$$P^w_{HCC}(i, j) = 10^{\frac{PMax(j)}{10}} - 10^{\frac{P_{CC}(i,j)}{10}} \quad \text{Equation (9)}$$

The power headroom for PA k in subframe i, denoted as $P_{HPA}(i,k)$ [dB], may be determined for all K PAs as described in Equation 2 for PUSCH transmission or for simultaneous PUSCH and PUCCH transmission as described in Equation 6 or some other unspecified criteria for PA-specific power headroom (230). Define $P^w_{HPA}(i,k)$ as $P_{HPA}(i,k)$ in linear rather than dB form, as:

$$P^w_{HPA}(i, k) = 10^{\frac{P_{AMAX}(k)}{10}} - \sum_{j|CC\ j\ mapped\ to\ PA\ k} 10^{\frac{P_{CC}(i,j)}{10}}. \quad \text{Equation (10)}$$

The WTRU may then identify those CC(s) with positive linear headroom, i.e., $P^w_{HCC}(i,j) \geq 0$ and those CC(s) with negative linear headroom, i.e., $P^w_{HCC}(i,j) < 0$ (240).

For each PA k, the WTRU may then determine the available PA power (250), denoted as $P^w_{APA}(i,k)$, as the sum of $P^w_{HPA}(i,k)$ plus the sum of $P^w_{HCC}(i,j)$ for all CCs j mapped to PA k, and having negative $P^w_{HCC}(i,j)$, or:

$$P^w_{APA}(i, k) = \quad \text{Equation (11)}$$
$$P^w_{HPA}(i, k) - \sum_{\substack{j|CC\ j\ mapped\ to\ PA\ k\ \&\ CC\\ j\ has\ negative\ linear\ headroom}} P^w_{HCC}(i, j),$$

or, equivalently:

$$P^w_{APA}(i, k) = \quad \text{Equation (12)}$$
$$P^w_{HPA}(i, k) - \sum_{j|CC\ j\ mapped\ to\ PA\ k} \min(0, P^w_{HCC}(i, j)),$$

where $$P^w_{APA}(i, k) \geq P^w_{HPA}(i, k). \quad \text{Equation (13)}$$

For each PA k, the WTRU may identify the PA as being one of three cases, denoted as A, B and C below (260). For each such case, the signaled CC-specific power headroom is computed as described.

The case in which the available PA power is positive and greater than or equal to the sum of positive CC-specific headroom reports is denoted as case A. For any CCs that per grant computed power may exceed their maximum allowed power, the specific CCs' actual headroom may be signaled so that the base station may be expected to reduce, by future grant, the CC-specific transmit power to that maximum allowed power. The available PA power may then be the original amplifier headroom plus that power gained by reducing the power of the negative-headroom CCs. In this case, the available power is more than the summed headroom reports of the positive-headroom CCs, so the actual headroom reports for those CCs are also signaled. If the base station were to fully utilize those headroom reports in a future grant, all CCs may be at their maximum transmit power, and the PA may be below its maximum transmit power.

Figure 3:
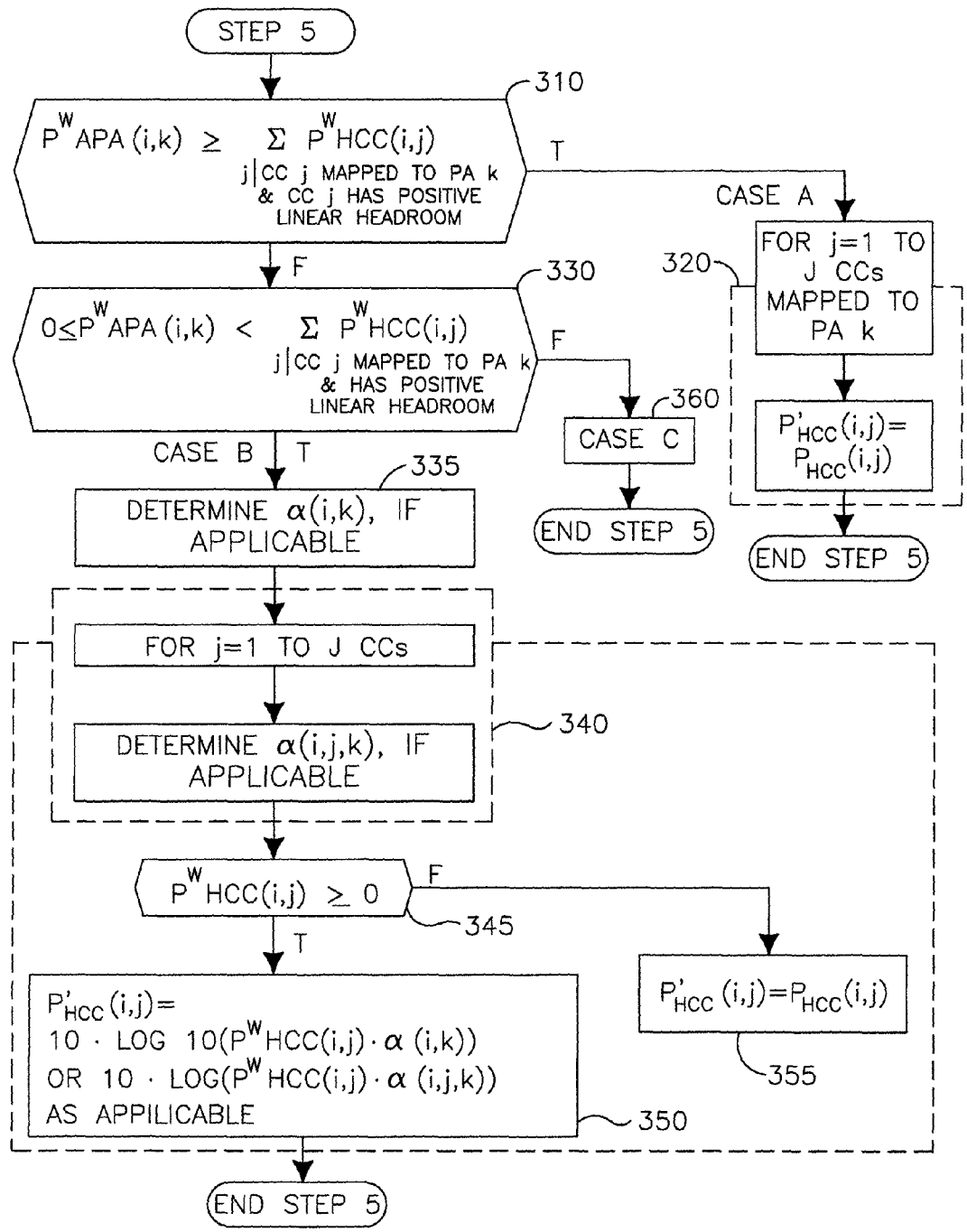

Referring now also to FIG. 3, in case A, for the available PA power, $P^w_{APA}(i,k)$, being positive and greater than or equal to the sum of CC-specific power headroom reports for CCs identified as having positive headroom (310), i.e., $$P^w_{APA}(i, k) \geq \quad \text{Equation (14)}$$
$$\sum_{j|CC\ j\ mapped\ to\ PA\ k\ \&\ CC\ j\ has\ positive\ linear\ headroom} P^w_{HCC}(i, j),$$

or, equivalently:

$$P^w_{APA}(i, k) \geq \sum_{j|CC\ j\ mapped\ to\ PA\ k} \max(0, P^w_{HCC}(i, j)). \quad \text{Equation (15)}$$

then for all such CCs, the WTRU may report $P'_{HCC}(i,j)$ as equal to $P_{HCC}(i,j)$, i.e., the signaled CC-specific headroom is as originally determined (320).

The case in which the available PA power is positive and less than the sum of positive CC-specific headroom reports is denoted as case B and is also shown in FIG. 3. For any CCs that per grant may exceed their maximum allowed power, their actual headroom may be signaled so that the base station may be expected to reduce, by future grant, the CC-specific transmit power to that maximum allowed power. The available PA power may then be the original amplifier headroom plus that power gained by reducing the power of the negative-headroom CCs. In this case, the available power is less than the summed headroom reports of the positive-headroom CCs, so the signaled headroom reports for the positive-headroom CCs are their actual headroom reports reduced by some amount such that all of the available PA power is apportioned amongst those CCs. If the base station were to fully utilize those headroom reports in a future grant, the formerly negative-headroom CCs may be at their maximum transmit power, the formerly positive-headroom CCs may be at some higher (though below their maximum allowed) transmit power, and the PA may be at its maximum transmit power.

In case B, for the available PA power, $P^w_{APA}(i,k)$, being positive and less than the sum of CC-specific headroom reports for CCs identified in Step 3 as having positive headroom (330), i.e., $$0 \le P^w_{APA}(i,k) < \sum_{j|CC\ j\ mapped\ to\ PA\ k\ \&\ has\ positive\ headroom} P^w_{HCC}(i,j), \quad \text{Equation (16)}$$

or, equivalently:

$$0 \le P^w_{APA}(i,k) < \sum_{j|CC\ j\ mapped\ to\ PA\ k} \max(0, P^w_{HCC}(i,j)). \quad \text{Equation (17)}$$

then the WTRU may determine a weighting factor, denoted as $\alpha(i,k)$, to fully apportion the available power amongst the CCs identified as having positive headroom (335). For illustrative purposes only, one example weighting may be the quotient of the available power and the sum of the positive CC-specific power headroom reports, or $$\alpha(i,k) = \frac{P^w_{APA}(i,k)}{\sum_{j|CC\ j\ mapped\ to\ PA\ k} \max(0, P^w_{HCC}(i,j))}. \quad \text{Equation (18)}$$

Other weightings may be possible (340), e.g., based on relative transmit powers per positive-power headroom CC, in which case there may be a separate weight for each CC j, denoted as $\alpha(i,j,k)$, or $$\alpha(i,j,k) = \frac{P^w_{CC}(i,j\ |\ CC\ j\ mapped\ to\ PA\ k)}{\sum_{j|CC\ j\ mapped\ to\ PA\ k\ \&\ has\ positive\ headroom} P^w_{CC}(i,j)}. \quad \text{Equation (19)}$$

Notwithstanding the method used to calculate $\alpha(i,k)$, after completing the case B method, the weighting may be computed such that the sum of the power headroom reports of those CC(s) identified as having positive headroom is then equal to the available power.

For CCs identified as having positive headroom (345), the WTRU may report $P'_{HCC}(i,j)$ as equal to $P^w_{HCC}(i,j) \cdot \alpha(i,k)$, or alternatively, e.g., $P^w_{HCC}(i,j) \cdot \alpha(i,j,k)$, converted to dB form, or $$P'_{HCC}(i,j) = 10 \cdot \log 10\left(10^{\frac{P_{HCC}(i,j)}{10}} \cdot \alpha(i,k)\right), \quad \text{Equation (20)}$$

or alternatively, $$P'_{HCC}(i,j) = 10 \cdot \log 10\left(10^{\frac{P_{HCC}(i,j)}{10}} \cdot \alpha(i,j,k)\right). \quad \text{Equation (21)}$$

where the reported headroom for the positive-headroom CCs is now lower than or equal to as originally determined (350).

For CCs identified as having negative headroom (345), the WTRU may report $P'_{HCC}(i,j)$ as equal to $P_{HCC}(i,j)$ i.e., the signaled CC-specific headroom as originally determined (355).

Figure 4:
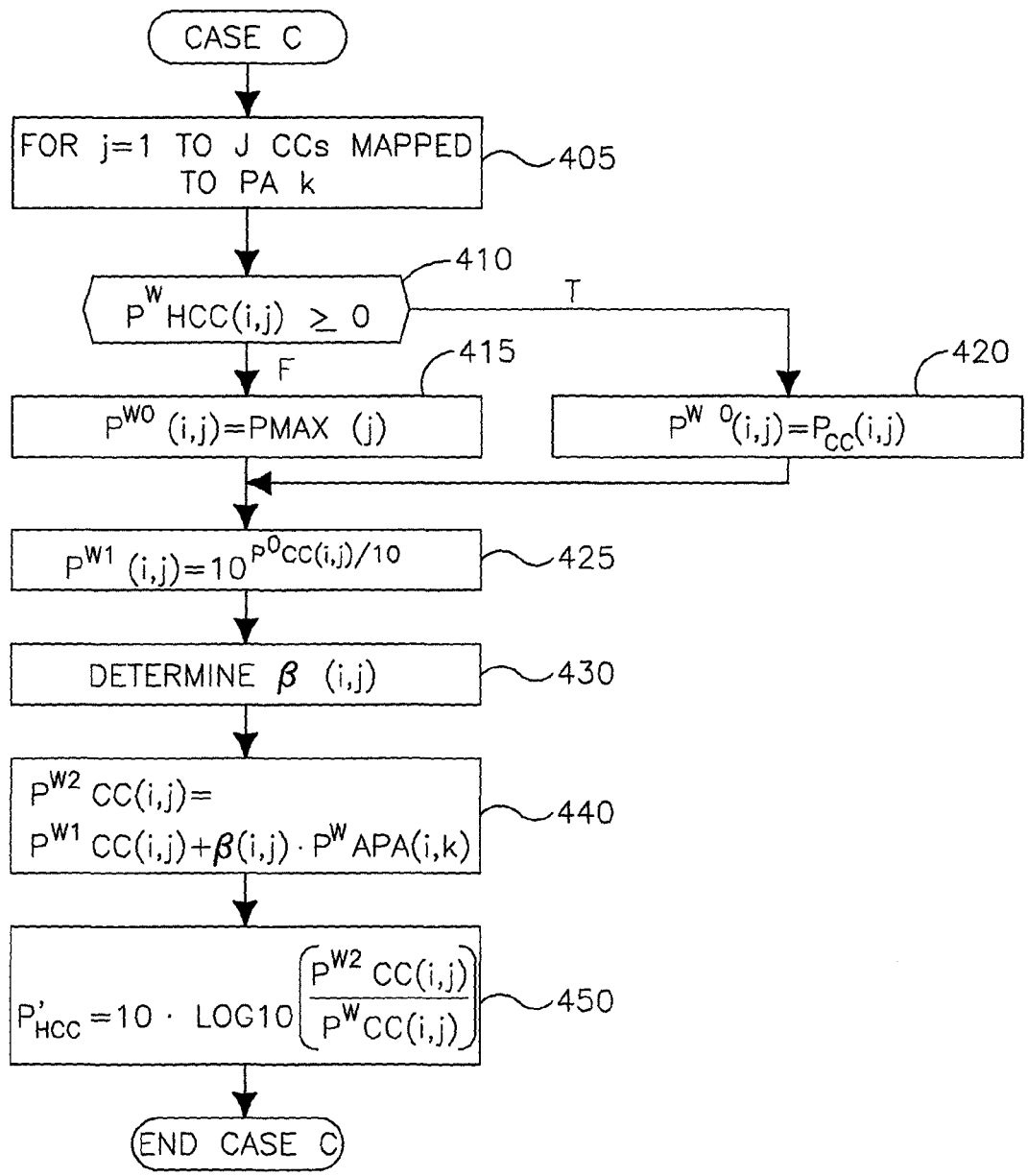

The case in which the available PA power is negative is denoted as case C and shown in FIG. 4. In this case, unlike case A and B, signaling actual headroom for the negative-headroom CCs and the base station reducing their transmit power by future grant yields negative PA available power, i.e., such a grant may "request" that the PA transmit at a power higher than its maximum allowed power. This may be so even if the headroom for the positive-headroom CCs were signaled such that the base station may reduce their transmit power by future grant to zero watts. Therefore, negative headroom reports may be signaled for all CCs such that the base station may reduce the transmit power by future grant of all CCs, such that a PA may be "requested" to transmit only at its maximum power, rather than exceed it. This is accomplished by first, similar to cases A and B, considering that if a future grant may reduce the transmit powers of the negative-headroom CCs to their maximums, what may be the resulting negative available PA power, i.e., a power shortage, and, second, by in some manner apportioning that shortage amongst all CCs such that the PA may be at its maximum transmit power. The CC-specific headroom reports are computed and signaled such that the base station may, by future grant, request CC-specific transmit powers to achieve this effect, i.e., if the base station were to by future grant reduce all CC-specific transmit powers by their signaled negative headroom reports, all CCs may be below their maximum transmit power and also lower than that requested by the previous grant, and the PA may be at its maximum transmit power. Note that in this case, the signaled headroom reports are computed relative to the transmit power from the previous grant, rather than as relative to the CC-specific maximum transmit power. In either case, the desired effect should be realized.

In case C, for the available PA power, $P^w_{APA}(i,k)$, being negative, i.e., $P^w_{APA}(i,k)<0$, then for the CCs (405) identified as having negative headroom (410), set a first temporary CC-specific transmit power, denoted as $P^{w1}_{CC}(i,j)$, to the maximum per-CC transmit power (415) and for CCs identified as having positive headroom (410), set the first temporary CC-specific transmit power to the requested CC-specific transmit power (420). Then convert to linear form (425), or, $$P^0_{CC}(i,j) = \begin{cases} P\text{Max}(j) & P^w_{HCC}(i,j) < 0 \\ P_{CC}(i,j) & P^w_{HCC}(i,j) \ge 0 \end{cases}, \quad \text{Equation (22)}$$

$$P^{w1}_{CC}(i,j) = 10^{\frac{P^0_{CC}(i,j)}{10}}. \quad \text{Equation (23)}$$

The WTRU may then compute a CC-specific weighting factor (430), denoted as β(i,j), from individual weighting factors assigned to each CC, as:

$$\beta(i, j) = \frac{w(i, j)}{\sum_{j \mid CC\ j\ mapped\ to\ PA\ k} w(i, j)},$$ Equation (24)

where w(i,j) may be a priority expressed as a numerical value in which the higher the value the higher the priority of the CC. For example, priority may be based on priority of the data or service supported by the CC, CC-specific transmit power, $P^{w1}{}_{CC}(i,j)$, modified by the determination of $P^{w1}{}_{CC}(i,j)$ if applicable, some combination thereof or some other criteria.

Note that β(i,j)≤1. That is, the weighting may be determined such that $$\sum_j \beta(i, j) = 1$$

and that after determining $P^{w2}{}_{CC}(i,j)$, the sum of the CC-specific transmit powers is equal to the maximum PA transmit power.

For all CCs, the WTRU may then compute a reduced second temporary CC-specific transmit power, denoted as $P^{w2}{}_{CC}(i,j)$, where the available power may be apportioned per the factor β(i,j) (440), or:

$$P^{w2}{}_{CC}(i,j) = P^{w1}{}_{CC}(i,j) + \beta(i,j) \cdot P^{w}{}_{APA}(i,k).$$ Equation (25)

For all CCs, the WTRU may then compute the signaled headroom as the ratio of reduced second CC-specific transmit power to that of the original requested CC-specific transmit power, in dB (450), or:

$$P'_{HCC} = 10 \cdot \log 10\left(\frac{P^{w2}_{CC}(i, j)}{P^{w}_{CC}(i, j)}\right).$$ Equation (26)

Note that within Case C, the variables first and second "temporary CC-specific transmit power" are intermediate variables used by the method, neither PA nor CC transmit powers are set to these values.

Described herein is another example method for signaling CC-specific power headroom. In this example method, the WTRU signals a modified CC-specific headroom, denoted as $P'_{HCC}(i,j)$ below, to the base station for all J CCs. The base station need not know the mapping of CCs to PAs, and the power control algorithm in the base station may be aware of the power headroom in each CC but does not know if the limitation is due to P-Max or $P_{AMAX}$. This example method may be referred to as Alternative 2.

The power headroom, denoted as $P_{HCC}(i,j)$ for CC j in subframe i, may be determined by the WTRU for all J CCs as shown in Equations 7 and 6, respectively, for PUSCH transmission or for simultaneous PUSCH and PUCCH transmission.

The WTRU then determines and signals a modified power headroom for each CC in the subframe as:

$$P'_{HCC}(i,j) = \min(P_{HCC}(i,j), P_{HPA}(i,k)),$$ Equation (27)

where $P_{HPA}(i,k)$ is as described above, and CC j is mapped to PA k.

Described herein is an example method for power headroom reporting for carrier aggregation when there may be a WTRU maximum power limit. The sum of per component carrier transmit powers may be subject to some maximum transmit power such that raising or lowering the transmit power of one component carrier may impact the ability to raise the transmit power in another component carrier. To account for this maximum transmit power, an example method is included for calculating and signaling of CC-specific power headroom when there is a WTRU maximum power limit.

For the case of the maximum WTRU transmit power, denoted as $P_{UEMAX}$, being less than the sum of the per-CC maximum transmit powers, PMax(j), the first example method (Alternative 1) for signaling CC-specific power headroom may result in the WTRU reporting per-CC power headrooms that may result in the base station scheduling grants that may correspond to WTRU transmit power which exceeds maximum WTRU transmit power. In the first example method, the power constraints are per-CC maximum transmit power, PMax(j), and per-PA maximum transmit power, $P_{AMAX}(k)$. The base station may, by using the signaled CC-specific power headroom from the WTRU, schedule grants that avoid exceeding maximum power in the CCs and avoid exceeding maximum power in the PAs.

In the present example method, the base station may, by using the signaled CC-specific headroom from the WTRU, schedule grants that avoid exceeding maximum power in the CCs and maximum allowed transmit power of the WTRU, and optionally maximum power in the PAs. The mapping of the WTRU to CCs and, optionally, CCs to PAs, may be illustrated by the example shown in Table 2 in which three CCs are transmitted by one WTRU, and the CCs may be mapped to two PAs.

TABLE 2

| WTRU | CC | PA |
|------|----|----|
| 1    | 1  | 1  |
|      | 2  | 2  |
|      | 3  |    |

For a given subframe, the nominal transmit power of the WTRU, i.e., before any reduction by a maximum power procedure, in linear form, is $$\sum_j 10^{\frac{P_{CC}(i,j)}{10}}.$$

Given the conventionally computed per-CC headroom(s), $P_{HCC}(i,j)$, and that the base station may schedule a future grant(s) such that the full transmit power capability of the WTRU may be scheduled, the transmit power of the hypothetical future subframe, i+r, denoted as $P^{w}{}_{WTRU}(i+r)$ may be $$P^{w}_{WTRU}(i+r) = \sum_j 10^{\frac{P_{CC}(i,j)}{10}} + \sum_j P^{w}_{HCC}(i, j)$$ Equation (28)

If $P^{w}{}_{WTRU}(i+r)$ were to exceed $P_{WTRUMAX}$ (in linear form), some or all of the reported per-CC power headrooms, $P_{HCC}(i,j)$, may have to be further reduced to avoid not only exceeding maximum power in the CCs, but also the maximum allowed transmit power of the WTRU.

An example method for modifying the reported per-CC power headrooms from the conventionally calculated headroom, $P_{HCC}(i,j)$ is now described. The modified $P_{HCC}(i,j)$ may be denoted as $P''_{HCC}(i,j)$. Initially, define $P^w_{HCC}(i,j)$ as $P_{HCC}(i,j)$ in linear rather than dB, as:

$$P^w_{HCC}(i,j) = 10^{\frac{PMax(j)}{10}} - 10^{\frac{P_{CC}(i,j)}{10}}. \quad \text{Equation (29)}$$

The WTRU may determine the power headroom for the WTRU in subframe i, denoted as $P_{HWTRU}(i)$ [dB]. Define $P^w_{HWTRU}(i)$ as $P_{HWTRU}(i)$ in linear form rather than dB form, as $$P^w_{HWTRU}(i) = 10^{\frac{P_{WTRUMAX}}{10}} - \sum_j 10^{\frac{P_{CC}(i,j)}{10}} \quad \text{Equation (30)}$$

The WTRU may then identify those CC(s) with positive linear headroom, i.e., $P^w_{HCC}(i,j) \geq 0$, and those CC(s) with negative linear headroom, i.e., $P^w_{HCC}(i,j) < 0$. The available WTRU power, denoted $P^w_{AWTRU}(i)$, may be determined as $P^w_{HWTRU}(i)$ plus the sum of $P^w_{HCC}(i,j)$ for all CCs j having negative $P^w_{HCC}(i,j)$, or:

$$P^w_{AWTRU}(i) = \quad \text{Equation (31)}$$
$$P^w_{HWTRU}(i) - \sum_{j|CC\ j\ has\ negative\ linear\ headroom} P^w_{HCC}(i,j),$$

or, equivalently:

$$P^w_{AWTRU}(i) = P^w_{HWTRU}(i) - \sum_j \min(0, P^w_{HCC}(i,j)) \quad \text{Equation (32)}$$

where $$P^w_{AWTRU}(i) \geq P^w_{HWTRU}(i).$$

Using one of the appropriate cases, denoted as cases A, B and C, the WTRU may compute and signal the CC-specific headroom.

For case A, where the available WTRU power, $P^w_{AWTRU}(i)$, is positive and greater than or equal to the sum of CC-specific headrooms for CCs identified as having positive headroom, i.e., $$P^w_{AWTRU}(i) \geq \sum_{j|CC\ j\ has\ positive\ linear\ headroom} P^w_{HCC}(i,j),$$

or equivalently:

$$P^w_{AWTRU}(i) \geq \sum_j \max(0, P^w_{HCC}(i,j)).$$

then the WTRU, for all CCs, may report $P''_{HCC}(i,j)$ as equal to $P_{HCC}(i,j)$.

For case B, where the available WTRU power, $P^w_{AWTRU}(i)$, may be positive and less than the sum of CC-specific headrooms for CCs identified as having positive headroom, i.e., $$0 \leq P^w_{AWTRU}(i) < \sum_{j|CC\ j\ has\ positive\ headroom} P^w_{HCC}(i,j)$$

or, equivalently:

$$0 \leq P^w_{AWTRU}(i) < \sum_j \max(0, P^w_{HCC}(i,j)).$$

then the WTRU may determine a weighting factor, denoted as $\alpha(1)$, to fully apportion the available power amongst the CCs identified as having positive headroom. For example, one possible such weighting is the quotient of the available power and the sum of the positive CC-specific headrooms, or $$\alpha(i) = \frac{P^w_{AWTRU}(i)}{\sum_j \max(0, P^w_{HCC}(i,j))} \quad \text{Equation (33)}$$

Other weightings are possible, e.g., based on relative transmit powers per positive-headroom CC. In this case, there may be a separate weight for each CC j, denoted as $\alpha(i,j)$, or $$\alpha(i,j) = \frac{P^w_{CC}(i,j)}{\sum_{j|CC\ j\ has\ positive\ headroom} P^w_{CC}(i,j)}. \quad \text{Equation (34)}$$

Notwithstanding the particular method used to compute the weighting factor, the weighting may be computed such that the sum of headrooms of those CC identified as having positive headroom(s) are then equal to the available power after computing $P''_{HCC}(i,j)$ as described below.

For the CCs identified as having positive headroom, the WTRU may report $P''_{HCC}(i,j)$ as equal to $P_{HCC}(i,j)\alpha(i)$, or alternatively, $P^w_{HCC}(i,j)\alpha(i,j)$, which may be converted to dB form:

$$P''_{HCC}(i,j) = 10 \cdot \log10\left(10^{\frac{P_{HCC}(i,j)}{10}} \cdot \alpha(i)\right), \quad \text{Equation (35)}$$

or alternatively, $$P''_{HCC}(i,j) = 10 \cdot \log10\left(10^{\frac{P_{HCC}(i,j)}{10}} \cdot \alpha(i,j)\right). \quad \text{Equation (36)}$$

Note that the reported headroom for the positive-headroom CCs is now lower than or equal to $P_{HCC}(i,j)$.

For CCs identified as having negative headroom, the WTRU may report $P''_{HCC}(i,j)$ as equal to $P_{HCC}(i,j)$.

For case 3, where the available WTRU power, $P^W_{AWTRU}(i)$ is negative, i.e., $P^W_{AWTRU}(i) < 0$, then the WTRU may, for the CCs identified as having negative headroom, set a first temporary CC-specific transmit power, denoted as $P^{w1}_{CC}(i,j)$, to the maximum per-CC transmit power and for CCs identified as having positive headroom, set the first temporary CC-specific transmit power to the requested CC-specific transmit power. Converting these to linear form:

$$P^0_{CC}(i, j) = \begin{cases} PMax(j) & P^w_{HCC}(i, j) < 0 \\ P_{CC}(i, j) & P^w_{HCC}(i, j) \geq 0 \end{cases} \quad \text{Equation (37)}$$

$$P^{w1}_{CC}(i, j) = 10^{\frac{P^0_{CC}(i,j)}{10}} \quad \text{Equation (38)}$$

The WTRU may then convert a CC-specific weighting factor, denoted as β(i,j) from individual weighting factors assigned to each CC, as:

$$\beta(i, j) = \frac{w(i, j)}{\sum_{j|CC\ j\ mapped\ to\ PA\ k} w(i, j)} \quad \text{Equation (39)}$$

where w(i,j) may be a priority expressed as a numerical value in which the higher the value the higher the priority of the CC. For example, this may be based on a priority of the data or service supported by the CC, a CC-specific transmit power ($P^{w1}_{CC}(i,j)$) modified by negative or positive headroom if applicable, some combination thereof, or some other criteria.

Noting that β(i,j)≤1, and notwithstanding the method that may be used for CC-specific transmit power, the weighting may be determined such that the term $$\sum_j \beta(i, j) = 1$$

and that after computing P"$_{HCC}$, the sum of the CC-specific transmit powers may be equal to the maximum WTRU transmit power.

The WTRU may then, for all CCs, compute a reduced second temporary CC-specific transmit power, denoted as $P^{w2}_{CC}(i,j)$, where the available power is apportioned per the factor β(i,j), or $$P^{w2}_{CC}(i,j) = P^{w1}_{CC}(i,j) + \beta(i,j) \cdot P^{w}_{AWTRU}(i). \quad \text{Equation (40)}$$

For all CCs, the WTRU may then compute the signaled headroom as the ratio of reduced second CC-specific transmit power to that of the original requested CC-specific transmit power, in dB, or $$P''_{HCC} = 10 \cdot \log 10\left(\frac{P^{w2}_{CC}(i, j)}{P^{w}_{CC}(i, j)}\right). \quad \text{Equation (41)}$$

To account for the maximum power of the PAs in addition to accounting for the CC maximum power and the WTRU maximum power, the method may include an option to combine first and last methods for signaling CC-specific power headrooms such that the WTRU signals the one headroom that represents the least amount of headroom available in the WTRU, (i.e., the worst case scenario). This may correspond to choosing and signaling as the headroom the lower value of P'$_{HCC}$(i,j) and P"$_{HCC}$(i,j).

Described herein is an example method for power headroom reporting (PHR) for fallback scenarios. In any given subframe, given N component carriers, the WTRU uses one of the up to 2^N combinations of transmission schemes. When a PHR trigger occurs, power headroom may be reported by the WTRU for the one transmission scheme combination that coincidently is used at that subframe. For a given CC, power headroom may vary significantly between that experienced in the configured and fallback transmission schemes due to potentially different transmit power requirements between the two transmission schemes. The base station, relying only on power headroom reported for one particular transmission scheme combination, may not have the complete set of information available to make appropriate scheduling decisions for the WTRU.

In LTE R8, there one is periodic timer and one prohibit timer. Power headroom may be reported when either the periodic timer expires, or there has been a large pathloss change since the previous headroom report, and the prohibit timer has expired.

In the example method for multiple component carriers, the WTRU may have one combination prohibit timer for each of the 2^N possible combinations of transmission schemes, replacing, or in addition to, the WTRU (alternatively, CC-specific) prohibit timer for the WTRU (alternatively, for each CC). Each combination prohibit timer may be set/reset with a different value, or the same value. The set/reset value(s) may be fixed, or configured by the base station signaling a new parameter(s), similar to prohibitPHR-Timer.

When triggered, the WTRU may transmit power headroom concurrently for all component carriers for the current transmission scheme combination, and restart the prohibit timer for that combination, as well as the periodic timer. Whenever the base station changes the WTRU's transmission scheme combination, the WTRU may send the power headroom for all active (alternatively all configured) component carriers for the new transmission scheme combination, unless prohibited by that combination's prohibit timer (because of a recent power headroom report for that same transmission scheme combination).

For the case of all component carriers configured to be in single-antenna port mode, fallback does not occur, and thus modification of the trigger algorithm as shown results in power headroom being reported as if the modification were not implemented.

An example implementation of the PHR for fallback is presented in Table 3 as a modification to the power headroom reporting procedure, where the WTRU prohibit timers may be replaced by the combination prohibits timers

TABLE 3

Power Headroom Reporting

The Power Headroom reporting procedure is used to provide the serving eNB with information about the difference between the nominal UE maximum transmit power and the estimated power for UL-SCH transmission. The reporting period, delay and mapping of Power Headroom are defined in subclause 9.1.8 of [36.133]. RRC controls Power Headroom reporting by configuring two types of timers periodicPHR-Timer and prohibitPHR-Timer, and by signalling dl-PathlossChange which sets the change in measured downlink pathloss to trigger a PHR [36.331]. For N configured component carriers, there are 2^N separate timers, denoted as prohibitPHR-Timer(tsc), where tsc is an index, e.g., 0≤tsc<(2^N), for each of the 2^N transmission scheme combinations and current tsc is the index of the transmission scheme combination in the current subframe. There is a trigger, denoted as trigger(tsc), for each transmission scheme combination.

TABLE 3-continued

Power Headroom Reporting

Figure 5:
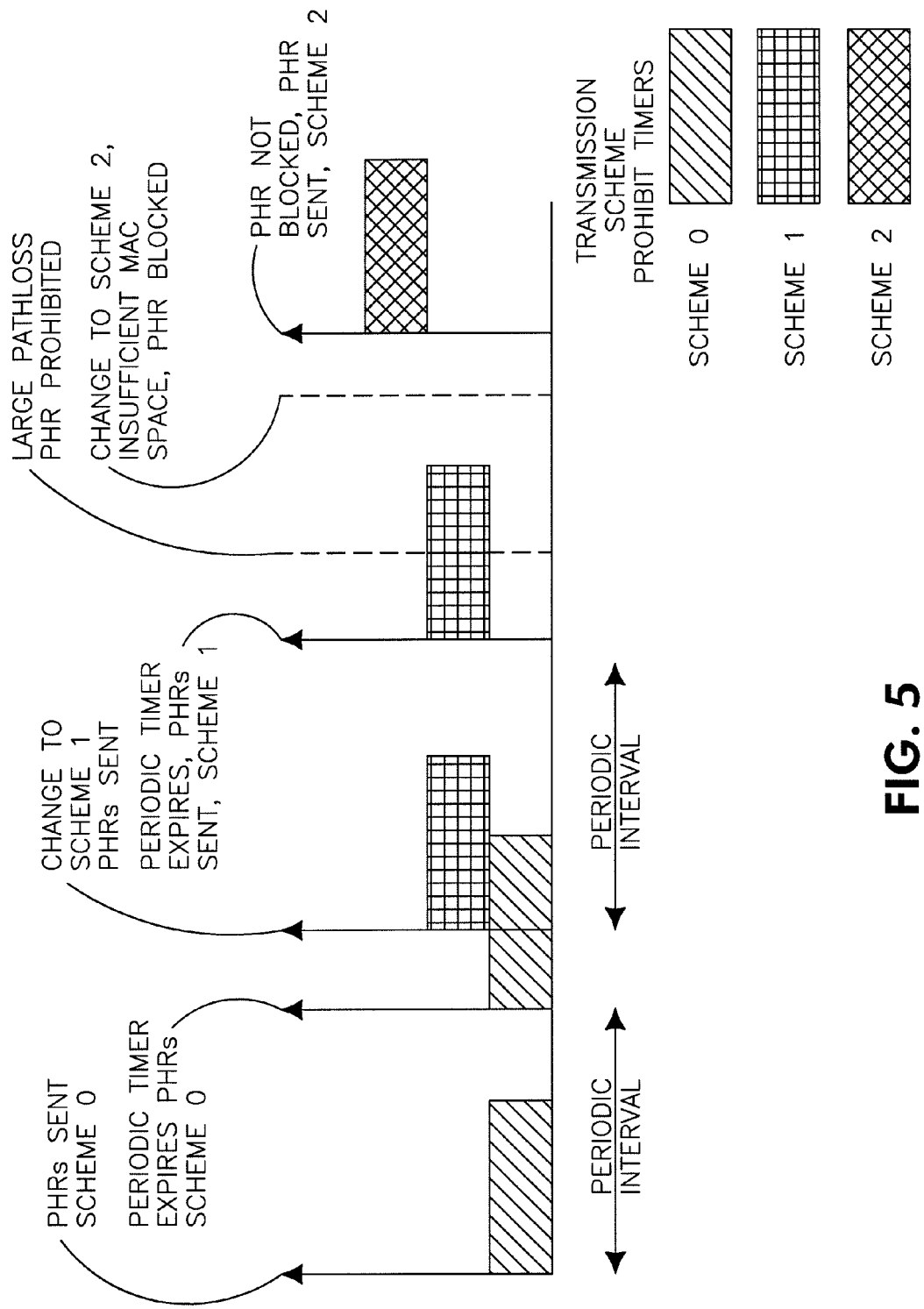
FIG. 5 is an example diagram illustrating a power headroom reporting method.

A Power Headroom Report (PHR) for all configured UL component carriers, active or
inactive,(alternatively for all active UL component carriers) shall be triggered for the current
transmission scheme combination if any of the following events occur:
    prohibitPHR-Timer(current tsc) expires or has expired and the path loss for any configured
    (alternatively active) component carrier has changed more than dl-PathlossChange dB since
    the transmission of a PHR when UE has UL resources for new transmission;
    prohibitPHR-Timer(current tsc) expires or has expired and the current transmission
    scheme is different from the transmission scheme of the previous transmission
    periodicPHR-Timer expires;
    upon configuration or reconfiguration of the power headroom reporting functionality by
    upper layers [8], which is not used to disable the function.
If the UE has UL resources allocated for new transmission for this TTI:
    if it is the first UL resource allocated for a new transmission since the last MAC reset,
    start periodicPHR-Timer;
    if the Power Headroom reporting procedure determines that trigger(current tsc) is set or
    this is the first time that a PHR is triggered, and;
    if the allocated UL resources can accommodate a PHR MAC control element plus its
    subheader as a result of logical channel prioritization for all configured (alternatively all
    active) UL component carriers:
       obtain the value of the power headrooms for all configured (alternatively all active)
       component carriers from the physical layer;
       instruct the Multiplexing and Assembly procedure to generate and transmit, for all
       configured (alternatively all active) UL component carriers, a PHR MAC control element
       based on the value reported by the physical layer;
       start or restart periodicPHR-Timer;
       start or restart prohibitPHR-Timer(current tsc);
       clear trigger for all tsc
    else set trigger(current tsc)
endif A diagram illustrating the method of Table 3, which by way of example shows the use of three of the possible 2^N transmission scheme combinations, is shown in FIG. 5. As illustrated, an initial PHR for scheme 0 may be transmitted which is followed by another PHR upon expiration of the scheme 0 periodic timer. A scheme 1 PHR is transmitted based on changing to scheme 1. A second PHR is transmitted upon expiration of the scheme 1 periodic timer. However, an event triggered PHR for scheme 1 is prohibited as the scheme 1 timer is still active. Upon changing to scheme 2, an attempt to transmit PHR is prohibited due to lack of medium access control (MAC) buffer space. A PHR triggered by the change to scheme 2 is successfully transmitted at a later time.

Alternatively, the base station may signal separate prohibit timer startup values for each transmission scheme combination, rather than signaling just one prohibit timer startup value. Using one common prohibit timer startup value or the signaling of separate such values may be either fixed or configurable.

In another method, given that the transmission scheme combination has changed since the previous transmission, and that the transmission scheme combination's prohibit timer has not expired, rather than sending power headroom for all configured (alternatively all active) component carriers, the WTRU may send the power headroom for the component carrier(s) with changed transmission scheme(s). Alternatively, for a transmission scheme transition to all configured (alternatively all active) component carriers using the configured transmission schemes, or all configured (alternatively all active) component carriers using the fallback transmission scheme, the WTRU may send power headroom for all configured (alternatively all active) component carriers. Otherwise, the WTRU may send power headroom reports just for the changed component carriers. The use of the methods may be fixed or configurable The transmission scheme for a fake component carrier may be the fallback scheme rather than the preferred configured scheme. The selection may be configurable, either common for all fake CCs or per component carrier.

Described herein are additional example methods for carrier aggregation taking into account a WTRU maximum transmit power. When there is a WTRU maximum transmit power, raising or lowering the transmit power of one component carrier may impact the ability to raise the transit power in another component carrier.

In one example method, the WTRU may compute and report power headroom for a CC as if the base station scheduler would respond to only that particular reported power headroom, and not change the grants of the other CCs. For each component carrier, the WTRU may determine the power headroom as the smaller of the headroom with respect to the CC maximum transmit power and the headroom with respect to the WTRU maximum transmit power given that the transmit powers of all other component carriers remain unchanged. In this method, the WTRU reports one PH per CC.

An example of this method follows. Note that this is a simplified example and as such all effects (such as maximum power reduction (MPR) and others) may not be taken into account. Also note that power headrooms are typically reported in decibel (dB) and watts are used here for ease of illustration.

Given 2 CCs, CC1 and CC2, which, based on their grants, may transmit at 0.75 W and 0.25 W, respectively. Also given are per CC maximum allowed transmit powers of 1 W and a WTRU maximum allowed transmit power of 1 W. Taking only the per CC maximum into account, each CC appears to have positive headroom. However, since the sum of the powers is 1 W, the WTRU has no headroom with respect to the WTRU maximum. The WTRU may report no (0) headroom for both CCs indicating to the base station that it may not increase the grant on one CC without decreasing the grant on the other. In another example, the WTRU limit may be given as 1.5 W. In this example, CC1 may be increased 0.25 W alone and CC2 may be increased 0.75 W alone. The maximum the total may be raised is 0.5 W. CC1 would report headroom based on the CC limit (able to increase another 0.25 W) and CC2 would report headroom based on the WTRU limit (able to increase another 0.5 W). As a variation on this method, the WTRU may determine and report both the power headroom for each CC as described and the power headroom for each CC with respect to its CC maximum power limit. Accordingly, the WTRU may report two power headrooms per CC.

Alternatively, the WTRU may determine and report power headroom in accordance with both methods above. In this method, the WTRU may report two power headrooms per CC. This method may use more PHR signaling than the method set forth above, but gives the base station the most complete set of information with respect to power headroom.

A variant of the above method and of the other methods described herein for which there is a WTRU maximum power limit may be to modify the nominal power headrooms of the multiple component carriers such that the base station may act upon all reported power headrooms and not violate any maximum power constraint. For example, in each of these methods the WTRU may compute power headroom for each CC such that it may allocate more headroom to higher priority CCs than lower priority. The WTRU may first compute the actual (nominal) headroom for each CC and then adjust the headrooms to report more positive headroom for higher priority component carriers over those of lower priority component carriers. Prioritization may be based on the type of CC, for example primary CC (PCC) may have priority over secondary CC(s) (SCC(s)). Prioritization may, alternatively, follow a rule similar to a maximum power procedure prioritization rule where, for example, PUCCH has highest priority, PUSCH with uplink control information (UCI) has next highest and PUSCH without UCI has lowest priority. In this case, the priority for headroom allocation may be based on which channel(s) the CC is carrying.

Power headroom may at times be reported for some combination of real and virtual component carriers.

Component carriers transmitted simultaneously with other component carriers can result in intermodulation and other effects, which can impact maximum transmission power, which in turn can impact per component carrier power headroom.

Methods for computing and reporting power headroom are described herein given that there may be real as well as virtual component carriers to support the base station in making scheduling decisions. In these methods, the effects due to the presence of the other CCs may include effects due to their transmit powers, intermodulation effects, impact on MPR, and/or the like. The example methods may use look up tables or calculations that are based on the transmit characteristics of the channels on the CCs (such as frequency, number of resource blocks and the like).

When the WTRU reports a power headroom for a virtual CC, the WTRU may transmit the power headroom on a real CC where the real CC may be configurable via signaling from the base station. Alternatively, the WTRU may autonomously determine a real CC for the virtual CC power headroom transmission. For example, the WTRU may use a real CC having the largest UL grant or the primary UL CC if it has a grant.

Described herein are example methods for power headroom reporting for real CCs. In one example method, for a subframe which may contain both real UL CCs (component carriers with grants) and virtual UL component carriers (active, or configured, component carriers without grants), the WTRU may, for each real CC, compute the power headroom taking into account the presence of (i.e., the effects due to the presence of) the other real CCs. The virtual CCs may be ignored when determining the power headroom for the real CCs. The WTRU may report one power headroom for each of the real CCs. This example method may represent the actual state of the WTRU at the time of the headroom report. This method may be applicable whether or not there are any virtual CCs in a given subframe and whether or not power headroom may be reported for virtual CCs in any subframe.

In another method, for a subframe which may contain both real UL CCs (component carriers with grants) and virtual UL component carriers (active, or configured, component carriers without grants), the WTRU may, for each real CC, compute the power headroom taking into account the presence (i.e., the effects due to the presence) of the other real CCs and the virtual CCs, assuming the virtual CCs are being transmitted with the reference or otherwise specified formats. The WTRU may report one power headroom for each of the real CCs. This method assumes the presence of all CCs, both real and virtual, and as the presence of additional component carriers tends to raise MPR and lower maximum power, this example method may provide the base station with a conservative estimate of additional power headroom.

Alternatively, the WTRU may compute the power headroom as described in the above two methods, and report both. This method may use more PHR signaling than does each of these methods but may give the base station the most complete set of information for power headroom.

In another alternative, it may be configurable via signaling from the base station as to whether to report power headroom in accordance with either of the two above disclosed methods. In this way, the base station may obtain the information it needs with only one PHR for each real CC.

Described herein are example methods for power headroom reporting for virtual CCs. In an example method, for a subframe which may include both real UL component carriers (component carriers with grants) and virtual UL component carriers (active, or configured, component carriers without grants), the WTRU may, for each virtual CC, compute the power headroom taking into account the presence of (i.e., the effects due to the presence of) all the real CCs. The other virtual CCs are ignored. The WTRU may report one power headroom for each of the virtual CCs. This method may be most useful for the case of the base station scheduling just the one additional virtual component carrier (i.e., in addition to the real CCs). As the presence of additional component carriers tends to raise MPR and thus lower maximum power, this example method may provide the base station with a liberal estimate of power headroom for the virtual CCs.

In another method, for a subframe which may include both real UL CCs (component carriers with grants) and virtual UL CCs (active, or configured, component carriers without grants), the WTRU may, for each virtual CC, compute the power headroom as if none of the other CCs, real or virtual, were present, and report one power headroom for each of the virtual CCs. This example method may be most useful for the case of the base station scheduling only the virtual CC.

In another example method, for a subframe which may include both real UL CCs (component carriers with grants) and virtual UL CCs (active, or configured, component carriers without grants), the WTRU may, for each virtual CC, compute the power headroom taking into account the presence of (i.e., the effects due to the presence of) all the real CCs and all the other virtual CCs assuming the virtual CCs are being transmitted with the reference or otherwise specified grant(s) or format(s), and report one power headroom for each of the virtual CCs. This example method may be most useful for the case of the base station scheduling all CCs. As the presence of additional component carriers tends to raise MPR and lower maximum power, this example method may provide the base station with a conservative estimate of power headroom for the virtual CCs.

In another method, the WTRU computes and reports each virtual CC power headroom as described in one or more of the methods for power headroom reporting for virtual CCs disclosed above. This method requires additional signaling.

Alternatively, it may be configurable via signaling from the base station as to which method to use for computing and reporting PHR for a virtual CC. In this way, the base station may obtain the information it needs with only one PHR for each virtual CC.

Described herein are example methods for including the power headroom report(s) in one or more media access control (MAC) packet data units PDUs. In LTE R8, the power headroom control element may be identified by a MAC PDU subheader with logical channel ID (LCID) 11010. There are 15 reserved logical channels i.e., logical channels 01011 to 11001 (in binary notation) corresponding to LCIDs 11 to 27 in decimal notation.

In an example method, the reserved logical channels may be re-used in support of CC specific or PA specific power headroom reporting. As part of a MAC configuration RRC message exchange between the base station and the WTRU, a mapping between the CC and the PH reporting logical channels may be defined. The WTRU may construct PH reports based on the mapping between the CC and PH reporting logical channels provided by the base station. Alternatively, the WTRU may autonomously define the mapping and communicate this mapping to the base station using an RRC message, for example.

The LTE R8 power headroom MAC control element consists of 1 octet. In the example method, the 6 least significant bits may be used for the actual PH report and the 2 most significant bits may be reserved. In an alternative method, the CC-specific and/or PA-specific PH may be reported by defining several 6-bit combinations from the 8 bit set. There are 28 combinations of 6 bits in 8 bits. A mapping between PH 6-bit combinations and CC or PA may be exchanged between the base station and the WTRU. The WTRU may then use for each CC, the corresponding 6-bit combinations to report the power headrooms.

Described herein are example methods for controlling power headroom reporting. In LTE R8, the MAC power headroom reporting may be triggered by three main events. In one case, the MAC power headroom reporting may be triggered when the PROHIBIT_PHR_TIMER expires or has expired and the path loss has changed more than DL_PathlossChange dB since the last power headroom report and the WTRU has UL resources for a new transmission. In the second case, the MAC power headroom reporting may be triggered when the PERIODIC_PHR_TIMER expires, in which case the PHR is referred to as "Periodic PHR". In the third case, the MAC power headroom reporting may be triggered upon configuration and reconfiguration of a Periodic PHR.

In an example method for controlling power headroom reporting, the reporting methods described above may be applied on a CC basis and/or on a PA basis. The MAC configuration for PH reporting purposes (which may include PERIODIC_PHR_TIMER, PROHIBIT_PHR_TIMER, DL_PathlossChange threshold) may be provided to the WTRU by the base station on a CC basis and/or on PA basis. Upon the reception of these configurations, the WTRU may apply them, i.e., use them for determining when to trigger PH reporting, on a CC basis and/or on PA basis.

In another method for controlling power headroom reporting, the WTRU may control CC-specific and/or PA-specific PH reporting on a group basis, i.e., CCs and/or PAs may be grouped for the purpose of PH reporting control. The WTRU may autonomously or in coordination with the base station may decide the grouping. The set of CCs and/or PAs that are within the same group are PH reported using the same reporting configuration parameter set (which may include PERIODIC_PHR_TIMER, PROHIBIT_PHR_TIMER, DL_PathlossChange threshold) or a subset. The group may be the complete set of the CCs and/or PAs.

In another method for controlling power headroom reporting, the control of the PH reporting may be done using a combination of the two alternative methods above.

The methods may also include methods for disabling power headroom reporting on a CC basis, PA basis, or a combination of CCs and/or PAs basis. Upon indication from a base station or autonomous determination by the WTRU, the WTRU may disable PH reporting for the relevant CCs and/or PAs.

Described herein are example methods for RRC configuration of MAC for power headroom reporting. The RRC protocol may be updated to configure the MAC such that the CC and/or PA PH reporting algorithm(s) described above may be supported. In one method, the LTE R8 MAC configuration IE (MAC-MainConfiguration) may be replicated for each CC and/or each PA. In another method, the PH configuration IE (phr-Configuration) within the LTE R8 MAC configuration IE (MAC-MainConfiguration) may be replicated per CC and/or per PA. In another method, RRC protocol updates may include system information blocks (SIBs) update in support of CC specific maximum power and/or PA specific maximum power as described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for reporting power headroom, the method comprising:
    calculating a physical uplink control channel (PUCCH) transmit power associated with a reference downlink control information (DCI) format in the absence of a PUCCH transmission;
    determining, via a wireless transmit/receive unit (WTRU), a power headroom using a physical uplink shared channel (PUSCH) transmit power and the PUCCH transmit power; and
    sending the power headroom.

2. A wireless transmit/receive unit (WTRU), the WTRU comprising:
a processor, the processor configured to:
calculate a physical uplink control channel (PUCCH) transmit power associated with a reference downlink control information (DCI) format in the absence of a PUCCH transmission;
determine a power headroom using a physical uplink shared channel (PUSCH) transmit power and the PUCCH transmit power; and
send the power headroom.

3. The method of claim 1, further comprising determining that the WTRU is configured for simultaneous PUSCH/PUCCH transmission.

4. The method of claim 1, wherein the power headroom is a first power headroom, the PUSCH transmit power is a first PUSCH transmit power, and the method further comprises:
determining a second power headroom using a second PUSCH transmit power; and
sending the first power headroom and the second power headroom in the same subframe.

5. The method of claim 4, wherein the first power headroom is for a carrier, the second power headroom is for the carrier, the first PUSCH transmit power is for the carrier, and the second PUSCH transmit power is for the carrier.

6. The method of claim 4, wherein the first power headroom is for a first carrier, the second power headroom is for a second carrier, the first PUSCH transmit power is for the first carrier, and the second PUSCH transmit power is for the second carrier.

7. The method of claim 1, further comprising determining a carrier has a PUSCH transmission in a subframe.

8. The method of claim 1, further comprising determining a maximum power for a carrier.

9. The method of claim 8, wherein the maximum power for the carrier is a WTRU configured maximum output for the carrier.

10. The method of claim 1, wherein the power headroom is for a primary cell.

11. The method of claim 1, wherein the reference DCI format is a DCI format 1A.

12. The method of claim 1, wherein determining the power headroom using the PUSCH transmit power and the PUCCH transmit power comprises:
determining a maximum transmit power for a carrier; and
calculating the power headroom using the maximum transmit power for the carrier, the PUSCH transmit power, and the PUCCH transmit power.

13. The WTRU of claim 2, wherein the WTRU is further configured to determine that the WTRU is configured for simultaneous PUSCH/PUCCH transmission.

14. The WTRU of claim 2, wherein the power headroom is a first power headroom, the PUSCH transmit power is a first PUSCH transmit power, and the processor is further configured to:
determine a second power headroom using a second PUSCH transmit power; and
send the first power headroom and the second power headroom in the same subframe.

15. The WTRU of claim 14, wherein the first power headroom is for a carrier, the second power headroom is for the carrier, the first PUSCH transmit power is for the carrier, and the second PUSCH transmit power for the carrier.

16. The WTRU of claim 14, wherein the first power headroom is for a first carrier, the second power headroom is for a second carrier, the first PUSCH transmit power is for the first carrier, and the second PUSCH transmit power is for the second carrier.

17. The WTRU of claim 2, wherein the processor is further configured to determine that a carrier has a PUSCH transmission in a subframe.

18. The WTRU of claim 2, wherein the processor is further configured to determine a maximum power for a carrier.

19. The WTRU of claim 18, wherein the maximum power for the carrier is a WTRU configured maximum output power for the carrier.

20. The WTRU of claim 2, wherein the power headroom is for a primary cell.

21. The WTRU of claim 2, wherein the reference DCI format is a DCI format 1A.

22. The WTRU of claim 2, wherein the processor is configured to determine the power headroom using the PUSCH transmit power and the PUCCH transmit power comprises:
determining a maximum transmit power for a carrier; and
calculating the power headroom using the maximum transmit power for the carrier, the PUSCH transmit power, and the PUCCH transmit power.

* * * * *